US011271876B2

(12) United States Patent
Yoon et al.

(10) Patent No.: US 11,271,876 B2
(45) Date of Patent: Mar. 8, 2022

(54) UTILIZING A GRAPH NEURAL NETWORK TO IDENTIFY SUPPORTING TEXT PHRASES AND GENERATE DIGITAL QUERY RESPONSES

(71) Applicant: Adobe Inc., San Jose, CA (US)

(72) Inventors: Seunghyun Yoon, Seoul (KR); Franck Dernoncourt, Sunnyvale, CA (US); Doo Soon Kim, San Jose, CA (US); Trung Bui, San Jose, CA (US)

(73) Assignee: Adobe Inc., San Jose, CA (US)

( * ) Notice: Subject to any disclaimer, the term of this patent is extended or adjusted under 35 U.S.C. 154(b) by 165 days.

(21) Appl. No.: 16/548,140

(22) Filed: Aug. 22, 2019

(65) Prior Publication Data

US 2021/0058345 A1 Feb. 25, 2021

(51) Int. Cl.
*H04L 12/58* (2006.01)
*G06F 16/903* (2019.01)
*G06F 16/901* (2019.01)
*G06N 3/08* (2006.01)
*H04L 51/02* (2022.01)

(52) U.S. Cl.
CPC ............ *H04L 51/02* (2013.01); *G06F 16/903* (2019.01); *G06F 16/9024* (2019.01); *G06N 3/08* (2013.01)

(58) Field of Classification Search
CPC ... H04L 51/02; G06F 16/903; G06F 16/9024; G06N 3/08
USPC ........................................................ 709/206
See application file for complete search history.

(56) References Cited

U.S. PATENT DOCUMENTS

| 2018/0212904 | A1* | 7/2018 | Smullen ................. H04L 67/322 |
| 2018/0349377 | A1* | 12/2018 | Verma .................... G06F 16/248 |
| 2020/0334416 | A1* | 10/2020 | Vianu ................... G06N 3/0445 |
| 2020/0342016 | A1* | 10/2020 | Morris ..................... G06F 40/30 |
| 2020/0387531 | A1* | 12/2020 | Agnihotram ........ G06F 16/3344 |
| 2021/0034809 | A1* | 2/2021 | Potash .............. G06F 16/90335 |

OTHER PUBLICATIONS

Weijie Bian, Si Li, Zhao Yang, Guang Chen, and Zhiqing Lin. 2017. A compare-aggregate model with dynamic-clip attention for answer selection. In Proceedings of the 2017 ACM on Conference on Information and Knowledge Management, pp. 1987-1990. ACM. Junyoung Chung, Caglar Gulcehre, KyungHyun Cho, and Yoshua Bengio. 2014. Empirical evaluation of gated recurrent neural networks on sequence modeling. arXiv preprint arXiv:1412.3555.

(Continued)

*Primary Examiner* — James E Springer
(74) *Attorney, Agent, or Firm* — Keller Jolley Preece

(57) ABSTRACT

The present disclosure relates to utilizing a graph neural network to accurately and flexibly identify text phrases that are relevant for responding to a query. For example, the disclosed systems can generate a graph topology having a plurality of nodes that correspond to a plurality of text phrases and a query. The disclosed systems can then utilize a graph neural network to analyze the graph topology, iteratively propagating and updating node representations corresponding to the plurality of nodes, in order to identify text phrases that can be used to respond to the query. In some embodiments, the disclosed systems can then generate a digital response to the query based on the identified text phrases.

20 Claims, 17 Drawing Sheets

(56) References Cited

OTHER PUBLICATIONS

Christopher Clark and Matt Gardner. 2018. Simple and effective multi-paragraph reading comprehension. In Proceedings of the 56th Annual Meeting of the Association for Computational Linguistics, pp. 845-855.
Nicola De Cao, Wilker Aziz, and Ivan Titov. 2018. Question answering by reasoning across documents with graph convolutional networks. arXiv preprint arXiv:1808.09920.
Jacob Devlin, Ming-Wei Chang, Kenton Lee, and Kristina Toutanova. 2018. Bert: Pre-training of deep bidirectional transformers for language understanding. arXiv preprint arXiv:1810.04805.
Will Hamilton, Zhitao Ying, and Jure Leskovec. 2017. Inductive representation learning on large graphs. In Advances in Neural Information Processing Systems, pp. 1024-1034.
Mandar Joshi, Eunsol Choi, Daniel Weld, and Luke Zettlemoyer. 2017. Triviaqa: A large scale distantly supervised challenge dataset for reading comprehension. In Proceedings of the 55th Annual Meeting of the Association for Computational Linguistics, pp. 1601-1611.
Diederik Kingma and Jimmy Ba. 2014. Adam: A method for stochastic optimization. arXiv preprint arXiv:1412.6980.
Thomas N Kipf and Max Welling. 2016. Semi-supervised classification with graph convolutional networks. arXiv preprint arXiv:1609.02907.
Rasmus Palm, Ulrich Paquet, and Ole Winther. 2018. Recurrent relational networks. In Advances in Neural Information Processing Systems, pp. 3368-3378.
Jeffrey Pennington, Richard Socher, and Christopher Manning. 2014. Glove: Global vectors for word representation. In Proceedings of the 2014 conference on empirical methods in natural language processing (EMNLP), pp. 1532-1543.
Matthew Peters, Mark Neumann, Mohit Iyyer, Matt Gardner, Christopher Clark, Kenton Lee, and Luke Zettlemoyer. 2018. Deep contextualized word representations. In Proceedings of the 2018 Conference of the North American Chapter of the Association for Computational Linguistics: Human Language Technologies, pp. 2227-2237.
Pranav Rajpurkar, Jian Zhang, Konstantin Lopyrev, and Percy Liang. 2016. Squad: 100,000+ questions for machine comprehension of text. In Proceedings of the 2016 Conference on Empirical Methods in Natural Language Processing, pp. 2383-2392.
Andrew M Saxe, James L McClelland, and Surya Ganguli. 2013. Exact solutions to the nonlinear dynamics of learning in deep linear neural networks. arXiv preprint arXiv:1312.6120.
Minjoon Seo, Aniruddha Kembhavi, Ali Farhadi, and Hannaneh Hajishirzi. 2016. Bidirectional attention flow for machine comprehension. In International Conference on Learning Representations (ICLR).
Gehui Shen, Yunlun Yang, and Zhi-Hong Deng. 2017a. Inter-weighted alignment network for sentence pair modeling. In Proceedings of the 2017 Conference on Empirical Methods in Natural Language Processing, pp. 1179-1189.
Yelong Shen, Po-Sen Huang, Jianfeng Gao, and Weizhu Chen. 2017b. Reasonet: Learning to stop reading in machine comprehension. In Proceedings of the 23rd ACM SIGKDD International Conference on Knowledge Discovery and Data Mining, pp. 1047-1055. ACM.
Nitish Srivastava, Geoffrey E Hinton, Alex Krizhevsky, Ilya Sutskever, and Ruslan Salakhutdinov. 2014. Dropout: a simple way to prevent neural networks from overfitting. Journal of machine learning research, 15(1):1929-1958.
Quan Hung Tran, Tuan Lai, Gholamreza Haffari, Ingrid Zukerman, Trung Bui, and Hung Bui. 2018. The context-dependent additive recurrent neural net. In Proceedings of the 2018 Conference of the North American Chapter of the Association for Computational Linguistics: Human Language Technologies, vol. 1, pp. 1274-1283.
Petar Veličković, Guillem Cucurull, Arantxa Casanova, Adriana Romero, Pietro Lio, and Yoshua Bengio. 2018. Graph attention networks. In International Conference on Learning Representations (ICLR).
Shuohang Wang and Jing Jiang. 2016. A compare-aggregate model for matching text sequences. arXiv preprint arXiv:1611.01747.
Shuohang Wang, Mo Yu, Xiaoxiao Guo, Zhiguo Wang, Tim Klinger, Wei Zhang, Shiyu Chang, Gerry Tesauro, Bowen Zhou, and Jing Jiang. 2018. R 3: Reinforced ranker-reader for open-domain question answering. In Thirty-Second AAAI Conference on Artificial Intelligence.
Wenhui Wang, Nan Yang, Furu Wei, Baobao Chang, and Ming Zhou. 2017. Gated self-matching networks for reading comprehension and question answering. In Proceedings of the 55th Annual Meeting of the Association for Computational Linguistics, pp. 189-198.
Dirk Weissenborn, Georg Wiese, and Laura Seiffe. 2017. Making neural qa as simple as possible but not simpler. In Proceedings of the 21st Conference on Computational Natural Language Learning (CoNLL 2017), pp. 271-280.
Johannes Welbl, Pontus Stenetorp, and Sebastian Riedel. 2018. Constructing datasets for multi-hop reading comprehension across documents. Transactions of the Association of Computational Linguistics, 6:287-302.
Caiming Xiong, Victor Zhong, and Richard Socher. 2016. Dynamic coattention networks for question answering. arXiv preprint arXiv:1611.01604.
Zhilin Yang, Peng Qi, Saizheng Zhang, Yoshua Bengio, William Cohen, Ruslan Salakhutdinov, and Christopher D Manning. 2018. Hotpotqa: A dataset for diverse, explainable multi-hop question answering. In Proceedings of the 2018 Conference on Empirical Methods in Natural Language Processing, pp. 2369-2380.

\* cited by examiner

| Model | dev | | train | |
|---|---|---|---|---|
| | MAP | MRR | MAP | MRR |
| IWAN [1] | 0.526 | 0.680 | 0.605 | 0.775 |
| sCARNN [2] | 0.534 | 0.698 | 0.620 | 0.792 |
| CompAggr [3] | 0.659 | 0.812 | 0.796 | 0.911 |
| CompClip [4] | 0.670 | 0.825 | 0.767 | 0.901 |
| PS-*avg* | 0.566 | 0.708 | 0.889 | 0.959 |
| PS-*rnn* | 0.700 | 0.822 | 0.919 | 0.971 |
| PS-*elmo-small* | 0.716 | 0.841 | 0.813 | 0.916 |
| PS-*elmo* | 0.734 | 0.853 | 0.863 | 0.945 |

UTILIZING A GRAPH NEURAL NETWORK TO IDENTIFY SUPPORTING TEXT PHRASES AND GENERATE DIGITAL QUERY RESPONSES

BACKGROUND

Recent years have seen significant improvements in hardware and software platforms that utilize artificial intelligence for responding to queries based on information contained in digital passages of text. For example, many conventional systems can receive a query provided by a user, analyze one or more digital passages of text (e.g., documents or portions of documents stored at a database or on a client device), and generate a digital response to the query based on the analysis. Although conventional systems can analyze repositories of text to respond to queries, such systems are often inflexible in that they rigidly generate digital responses based on individual phrases, and such systems are often inaccurate in identifying relevant support for a digital response.

These, along with additional problems and issues, exist with regard to conventional query response systems.

SUMMARY

One or more embodiments described herein provide benefits and/or solve one or more of the foregoing or other problems in the art with systems, methods, and non-transitory computer-readable media that utilize a graph neural network to flexibly and accurately identify supporting text phrases that can be utilized to generate accurate digital query responses. For example, in one or more embodiments, the disclosed systems generate a graph topology connecting a plurality of nodes that represent text phrases (e.g., sentences) from one or more passages and represent query text. The disclosed systems can then utilize a graph neural network to propagate information between the nodes through iterative hops. Accordingly, the disclosed systems can use the graph neural network to identify supporting text phrases (e.g., text phrases within the same passage or across several different passages) that correspond to the query based on the propagation of information across edge connections within the graph topology. In one or more embodiments, the disclosed systems then generate a digital response to the query based on the identified supporting text phrases. In this manner, the disclosed systems can flexibly identify multiple text phrases having relevant information that could not be identified when considering sentences in isolation in order to generate accurate digital responses.

Additional features and advantages of one or more embodiments of the present disclosure are outlined in the following description.

BRIEF DESCRIPTION OF THE DRAWINGS

This disclosure will describe one or more embodiments of the invention with additional specificity and detail by referencing the accompanying figures. The following paragraphs briefly describe those figures, in which:

FIG. 7 illustrates a table reflecting experimental results regarding the effectiveness of the support identification system in accordance with one or more embodiments;

DETAILED DESCRIPTION

Figure 1:
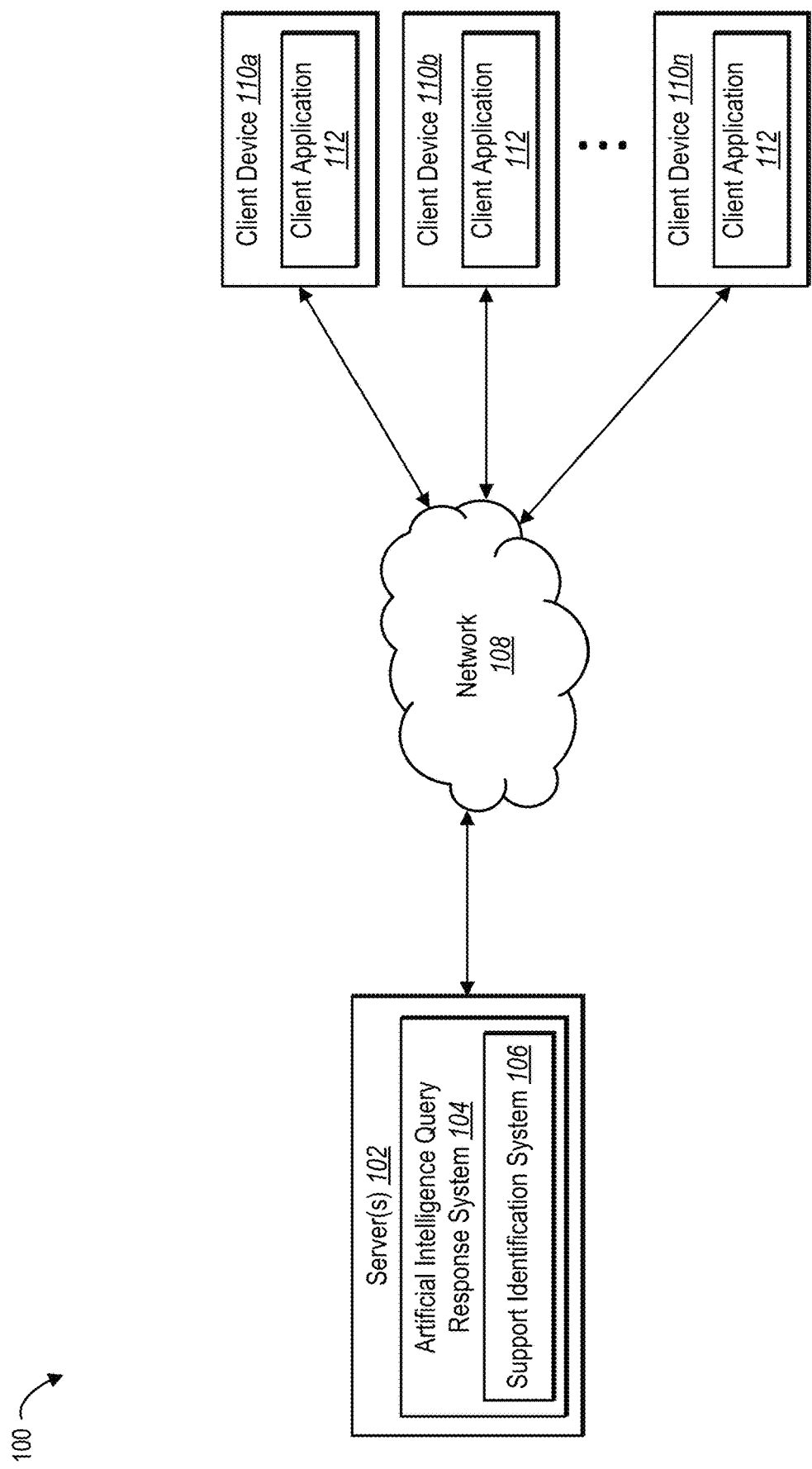
FIG. 1 illustrates an example environment in which a support identification system can operate in accordance with one or more embodiments.

One or more embodiments described herein include a support identification system that utilizes a graph neural network to flexibly identify supporting text phrases for generating a digital query response based on a graph topology representing a plurality of text phrases. For example, the support identification system can generate a graph topology in which each node represents a query or one of a plurality of text phrases (e.g., sentences). Moreover, the support identification system can generate the graph topology by selectively connecting pairs of nodes based on the structure of the passages containing the text phrases. The support identification system can then use a graph neural network to implement iterative attentive aggregation and a skip-combine method in which a node interacts with its neighboring (i.e., connected) nodes to identify text phrases that include information relevant for responding to the query (i.e., supporting text phrases). In one or more embodiments, these supporting text phrases include multiple text phrases within the same passage or across several different passages. In some embodiments, based on these identified text phrases, the support identification system can generate a digital response to the query.

To provide an example, in one or more embodiments, the support identification system identifies a query and a plurality of text phrases and generates a graph topology that includes edge connections between a plurality of nodes corresponding to the query and the text phrases. In one or more embodiments, the support identification system utilizes a support identification graph neural network to identify supporting text phrases from the plurality of text phrases based on the graph topology. In particular, the support identification graph neural network can determine similarity measures between the plurality of nodes based on the edge connections within the graph topology. The support identification graph neural network can further identify supporting text phrases that correspond to the query from the plurality of text phrases based on the determined similarity measures. In some embodiments, the support identification system subsequently generates a digital response to the query based on the supporting text phrases.

As just mentioned, in one or more embodiments, the support identification system generates a graph topology having edge connections between a plurality of nodes corresponding to a plurality of text phrases and a query. In particular, each node in the graph topology can correspond to an individual text phrase or the query text. In one or more embodiments, the support identification system generates the graph topology by generating edge connections between particular sets of nodes. For example, the support identification system can generate edge connections between nodes corresponding to text phrases within the same passage, generate edge connections between nodes corresponding to text phrases and a node corresponding to the query, and generate edge connections between nodes corresponding to select text phrase from each passage (e.g., between the first text phrase from each passage).

The support identification system can populate nodes within the graph topology by embedding text phrases or queries corresponding to each node. For example, in one or more embodiments, the support identification system generates text phrase embeddings for each text phrase node by applying a language embedding model to each text phrase. Similarly, the support identification system can generate query embeddings by applying a language embedding model to a query. The support identification system can utilize these embeddings as initial node representations for each corresponding node in the graph topology.

Additionally, as mentioned above, in one or more embodiments, the support identification system utilizes a support identification graph neural network to identify supporting text phrases from the plurality of text phrases. In particular, the support identification graph neural network can determine similarities between the plurality of nodes based on the graph topology. For example, in one or more embodiments, the support identification graph neural network determines, for a given node, the similarity between a node representation for that node and the node representation for each of its connected nodes (i.e., nodes to which the given node is connected via an edge connection).

The support identification graph neural network can propagate node representations among the plurality of nodes based on the determined similarities and then update the node representation of each node. For instance, the support identification system can compare node representations while applying learned edge weights of the support identification graph neural network to propagate and modify node representations across edge connections. Specifically, the support identification system can apply an attentive aggregation function based on learned edge weights and a similarity comparison between node pairs to determine attention weights. The support identification system can then apply the attention weights to determine the amount of information to propagate in modifying each node representation based on neighboring (e.g., connected) nodes.

In some embodiments, the support identification graph neural network can propagate node representations iteratively, updating the node representation of a given node with each iteration. Indeed, in one or more embodiments, the support identification system applies learned update weights from the support identification graph neural network as part of a skip connection to determine an amount or degree to update the node representation between iterations. By applying attention weights and learned update weights, the support identification system can iteratively propagate and update node representations across edge connections. The support identification graph neural network can then identify supporting text phrases based on the updated node representation of each node.

By utilizing a graph neural network, the support identification system can identify supporting text phrases across a variety of different texts, passages, or documents. For example, in one or more embodiments, the support identification system can identify supporting text phrases across multiple different text phrases within a passage or across text phrases from multiple passages. Indeed, by utilizing a graph neural network, the support identification system can analyze the graph topology to identify supporting text phrases for a query from a variety of different locations or sources.

In addition to utilizing a support identification graph neural network, the support identification system can also train a support identification graph neural network to identify supporting text phrases. In particular, the support identification system can use the support identification graph neural network to generate predicted node representations based on a training graph topology that corresponds to training text phrases and a training query. The support identification system can then determine a loss based on the predicted node representations and modify parameters of the support identification graph neural network based on the loss. In particular, the support identification system can utilize the loss to learn parameters (e.g., edge weight parameters and update parameters) within the support identification graph neural network.

In training the support identification graph neural network, the support identification system can determine and utilize multiple different loss measures. For example, in some embodiments, the support identification system determines an attention loss for each hop (e.g., based on attention weights) and a rank loss based on the final node representation of the query and text passages. The support identification system can then combine the attention loss and the rank loss to determine an overall loss used for modifying the parameters of the support identification graph neural network.

As further mentioned above, in one or more embodiments, the support identification system generates digital responses to queries based on identified supporting text phrases. In particular, the support identification system can utilize information (e.g., words, names, ideas, etc.) within identified supporting text phrases to generate a digital response to a query. As mentioned, in some embodiments, at least some of the supporting text phrases include different information useful for responding to the query. Thus, the support identification system can generate digital responses to queries based on different information included in various text phrases.

As mentioned above, conventional query response systems suffer from several technological shortcomings that result in inflexible and inaccurate operation. For example, conventional query response systems are often inflexible in that they rigidly generate digital responses to queries based on individual phrases (e.g., sentences) included in the analyzed passages of text. Indeed, many conventional systems employ models that search for a single phrase containing information that is relevant to a query and then generate a digital response from that phrase, if found. Even if a conventional system identifies multiple supporting phrases, such models analyze each phrase in isolation (e.g., generate a score for each phrase and then rank the phrases). Such approaches fail to generate digital responses for queries that require reasoning and analysis across phrases (e.g., analysis across multiple passages or multiple documents).

In addition to flexibility concerns, conventional query response systems are also inaccurate. As mentioned, many conventional systems generate digital responses based on individual text phrases. Accordingly, such conventional systems often fail to provide digital responses that accurately reflect available information. Accordingly, digital responses are often inaccurate, incomplete, and unreliable.

The support identification system provides several advantages over conventional systems. For example, the support identification system can operate more flexibly than conventional systems. In particular, by utilizing a support identification graph neural network to identify supporting text phrases that correspond to a query, the support identification system can generate digital responses to queries using information, trends, and analysis across multiple text phrases (e.g., across sentences). Indeed, by propagating information along edge connections within a graph topology, the support identification system can flexibly analyze inter-relations and similarities between text phrases from different passages or documents that are relevant in responding to a query.

Further, the support identification system can operate more accurately than conventional systems. Indeed, by analyzing and identifying multiple supporting text phrases that correspond to a query, the support identification system can generate more accurate digital responses to the query, especially where responding to the query requires using information included across multiple sources. Indeed, by using the support identification graph neural network to iteratively propagate and update node representations corresponding to text phrases and queries, the support identification system can learn and identify supporting themes across different phrases through the graph topology and thus more accurately identify which text phrases are relevant for responding to the query.

As illustrated by the foregoing discussion, the present disclosure utilizes a variety of terms to describe features and benefits of the support identification system. Additional detail is now provided regarding the meaning of these terms. For example, as used herein, the term "query" refers to a request for information. In particular, a query can refer to a request for information included within one or more passages of text. For example, a query can include, but is not limited to, a factoid question, a list question, a definition question, a search request, etc.

Additionally, as used herein, the term "passage" (or "text passage" or "passage of text") refers to textual content. In particular, a passage can refer to textual content included in a digital file, which can include the entirety of the text included in the digital file or an excerpt of the text from the digital file. For example, a passage can include, but is not limited to, a document (i.e., all text within the document), an excerpt of text from a document (e.g., one or more paragraphs of text), a caption for an image or graph, a footnote or end note included in a digital file, etc.

Further, as used herein, the term "text phrase" refers to text included within a passage. In particular, a text phrase can refer to text included within a passage, which can include the entirety of the text included in the passage or a portion of the text included in the passage. For example, a text phrase can include a sentence or other group of words or phrases within a passage.

Relatedly, as used herein, the term "supporting text phrase" includes a text phrase that corresponds to a query. In particular, a supporting text phrase can refer to a text phrase that includes information that is relevant for responding to a query. For example, a supporting text phrase can refer to a text phrase having an answer to a question or having information upon which a response to a query can otherwise be based.

As used herein, the term "graph topology" refers to an organization of nodes corresponding to different text. In particular, a graph topology can refer to an organization of nodes where each node reflects data corresponding to a text phrase or a text query. For example, a graph topology can include an organization of nodes where embeddings corresponding to text phrases and a query are stored in corresponding nodes of the graph topology. In particular, a "text-phrase node" refers to a node of a graph topology that corresponds to a text phrase. Similarly, a "query node" refers to a node of a graph topology that corresponds to a query.

Further, as used herein, the term "edge connection" (or "edge") refers to an association between nodes. In particular, an edge connection refers to a link or connection between one node and another node within a graph topology. For example, an edge connection can refer to a connection between two nodes indicating that at least one of the nodes will propagate information associated with that node to the other node. Thus, an edge connection can include an indicator that a node representation from a first node will be (or has been) applied to a node representation from a second node (and/or vice versa).

Additionally, as used herein, the term "connected node" refers to a node that is associated with another node. In particular, a connected node can refer to a node that is connected to another node via an edge connection within a graph topology. For example, a connected node can include a query node or a text-phrase node that is connected to another node (i.e., either a query node or a text-phrase node) via an edge connection. In some embodiments, a connected node specifically refers to a node that is directly connected to another node (i.e., without any intermediate nodes).

Additionally, as used herein, the term "node representation" refers to data stored as part of a node. In particular, a node representation can refer to an embedding that corresponds to a variable and that is stored as part of a node. For example, a node representation can include an embedding, stored as part of a node, that corresponds to (i.e., represents) a query or a text phrase from a passage of text. In particular, the term "text-phrase node representation" refers to a node representation associated with a text-phrase node. Similarly, the term "query node representation" refers to a node representation associated with a query node. Likewise, as used herein, the term "connected node representation" refers to a node representation of a connected node.

Relatedly, as used herein, the term "modified node representation" refers to a node representation that is modified and utilized to update a node representation. In particular, a modified node representation can refer to a value that corresponds to a particular node and is based on the node representations of the connected nodes corresponding to that node. The support identification system can apply a node representation, a modified node representation, and a learned update parameter to generate an updated node representation (to be utilized in a subsequent iteration of applying the graph neural network).

Further, as used herein, the term "similarity measure" refers to a metric that measures the likeness between two or more data objects. In particular, a similarity measure can refer to a metric that measures the similarity between node representations in an embedding space. For example, a similarity measure can indicate the similarity between a query node representation and a text-phrase node representation or the similarity between two text-phrase node representations. For instance, the support identification system can perform a similarity comparison between two nodes. A similarity comparison can include determining a measure of distance in vector space (e.g., a distance in a semantic vector space), a cosine similarity, a dot product, or another similarity comparison. The support identification system can generate a similarity measure based on the similarity comparison (and/or one or more learned edge weights, as described in greater detail below).

As used herein, the term "edge weight" (or "learned edge weight") refers to a weighting value for propagating information across edge connections between nodes. In particular, an edge weight can refer to a value that determines the information shared between two nodes connected via an edge connection in a graph topology. For example, an edge weight can include a fraction value or percentage value that modifies the degree or amount that a node representation is propagated from one node to another node. In one or more embodiments, an edge weight includes a learned parameter obtained by training a model (e.g., a support identification graph neural network) to analyze a graph topology.

Additionally, as used herein, the term "update weight" (or "learned update weight") refers to a weighting value that indicates how a value is updated. In particular, an update weight can refer to a value that modifies how a node representation is updated based on other values (e.g., updated from a previous iteration). For example, an update weight can include a fraction value or percentage value that modifies the degree or extent to which a node representation from a first iteration will be updated by a modified node representation from a second iteration. In one or more embodiments, an update weight includes a learned parameter obtained by training a model (e.g., a support identification graph neural network) to analyze a graph topology.

Further, as used herein, the term "attention weight" refers to a weighting value that determines information shared among nodes of a graph topology based on one or more characteristics of the nodes. In particular, an attention weight can refer to a value that modifies the information shared between pairs of connected nodes via an edge connection based on an attention characteristic (e.g., similarity) between the pairs of connected nodes. In some embodiments, a given node can have a first attention weight regarding the pairing of the given node and a first connected node and a second attention weight regarding the pairing of the given node and a second connected node. In other words, in one or more embodiments, an attention weight can be unique to a pair of nodes (or, at least, does not necessarily have the same value as an attention weight associated with another pair of nodes). In one or more embodiments, an attention weight includes a parameter determined based on a similarity measure between two nodes (i.e., the node representations of those nodes) and a learned edge weight as will be discussed in more detail below.

As used herein, the term "embedding" refers to a numerical or vector representation of a variable. For example, an embedding can include a numerical or vector representation of a word, a query, or a text phrase from a passage of text. Indeed, as used herein, the term "word embedding" refers to an embedding that represents an individual word (e.g., a word from a text-phrase or from a query). As used herein, the term "text-phrase embedding," refers to an embedding that represents a text phrase. Similarly, as used herein, the term "query embedding" refers to an embedding that represents a query.

Additionally, as used herein, the term "language embedding model" refers to a computer algorithm or model that generates embeddings associated with text. In particular, a language embedding model can refer to a computer algorithm that analyzes text (e.g., a word or a grouping of words, such as a text phrase) and generates one or more corresponding embeddings. For example, a language embedding model can include learning algorithms, such as the GloVe model or the ELMo model.

Additionally, as used herein, the term "neural network" refers to a machine learning model that can be tuned (e.g., trained) based on inputs to approximate unknown functions. In particular, the term neural network can include a model of interconnected artificial neurons (e.g., organized in layers) that communicate and learn to approximate complex functions and generate outputs based on a plurality of inputs provided to the model. For instance, the term neural network includes one or more machine learning algorithms. In addition, a neural network can refer to an algorithm (or set of algorithms) that implements deep learning techniques that utilize a set of algorithms to model high-level abstractions in data. To illustrate, a neural network can include a convolutional neural network, a recurrent neural network, a generative adversarial neural network, and/or a graph neural network (i.e., a neural network that comprises learned parameters for analyzing a graph topology).

As used herein, the term "support identification graph neural network" refers to a neural network that analyzes a graph topology to identify supporting text phrases that correspond to a query. In particular, a support identification graph neural network can refer to a neural network that utilizes learned parameters to analyze a graph topology that includes nodes corresponding to a query and a plurality of text phrases to identify supporting text phrases that are relevant for responding to the query.

Additional detail regarding the support identification system will now be provided with reference to the figures. For example, FIG. 1 illustrates a schematic diagram of an exemplary system environment ("environment") 100 in which a support identification system 106 can be implemented. As illustrated in FIG. 1, the environment 100 can include a server(s) 102, a network 108, and client devices 110a-110n.

Although the environment 100 of FIG. 1 is depicted as having a particular number of components, the environment 100 can have any number of additional or alternative components (e.g., any number of servers, client devices, or other components in communication with the support identification system 106 via the network 108). Similarly, although FIG. 1 illustrates a particular arrangement of the server(s) 102, the network 108, and the client devices 110a-110n, various additional arrangements are possible.

The server(s) 102, the network 108, and the client devices 110a-110n may be communicatively coupled with each other either directly or indirectly (e.g., through the network 108 discussed in greater detail below in relation to FIG. 11). Moreover, the server(s) 102 and the client devices 110a-110n may include a variety of computing devices (including one or more computing devices as discussed in greater detail with relation to FIG. 11).

As mentioned above, the environment 100 includes the server(s) 102. The server(s) 102 can generate, store, receive, and/or transmit data, including queries and/or digital responses. For example, the server(s) 102 can receive a query from a client device (e.g., one of the client devices 110a-110n) and transmit a digital response to the query back to the client device. In one or more embodiments, the server(s) 102 comprises a data server. The server(s) 102 can also comprise a communication server or a web-hosting server.

As shown in FIG. 1, the server(s) 102 can include an artificial intelligence query response system 104. In particular, the artificial intelligence query response system 104 can perform digital query response functions. For example, the artificial intelligence query response system 104 can receive a query from a client device (e.g., one of the client devices 110a-110n). The artificial intelligence query response system 104 can subsequently analyze one or more passages of text and generate a digital response to the query based on the analysis. The artificial intelligence query response system 104 can provide the digital response back to the client device.

Additionally, the server(s) 102 include the support identification system 106. In particular, in one or more embodiments, the support identification system 106 utilizes the server(s) 102 to identify one or more supporting text phrases corresponding to a query (e.g., having information that is relevant for responding to the query). For example, the support identification system 106 can use the server(s) 102 to identify (e.g., receive) a query and then identify one or more supporting text phrases that correspond to the query.

For example, in one or more embodiments, the support identification system 106, via the server(s) 102, can identify a query and a plurality of text phrases (e.g., from one or more passages of text). Subsequently, the support identification system 106, via the server(s) 102, can generate a graph topology having edge connections between the plurality of nodes corresponding to the query and the plurality of text phrases. The support identification system 106 can then utilize a support identification graph neural network to identify one or more supporting text phrases from the plurality of text phrases. For example, the support identification graph neural network can determine similarities between the plurality of nodes based on the graph topology and then identify supporting text phrases based on the determined similarities. In one or more embodiments, the support identification system 106, via the server(s) 102, further generates a digital response to the query based on the identified supporting text phrases.

In one or more embodiments, the client devices 110a-110n include computer devices that can submit queries and receive digital responses to those queries. For example, the client devices 110a-110n can include smartphones, tablets, desktop computers, laptop computers, or other electronic devices. The client devices 110a-110n can include one or more applications (e.g., the client application 112) that can submit queries and receive digital responses to those queries. For example, the client application 112 can include a software application installed on the client devices 110a-110n. Additionally, or alternatively, the client application 112 can include a software application hosted on the server(s) 102, which may be accessed by the client devices 110a-110n through another application, such as a web browser.

The support identification system 106 can be implemented in whole, or in part, by the individual elements of the environment 100. Indeed, although FIG. 1 illustrates the support identification system 106 implemented with regard to the server(s) 102, different components of the support identification system 106 can be implemented in a variety of the components of the environment 100. For example, one or more components of the support identification system 106 can be implemented by a client device. Example components of the support identification system 106 will be discussed in more detail with regard to FIG. 9 below.

Figure 2:
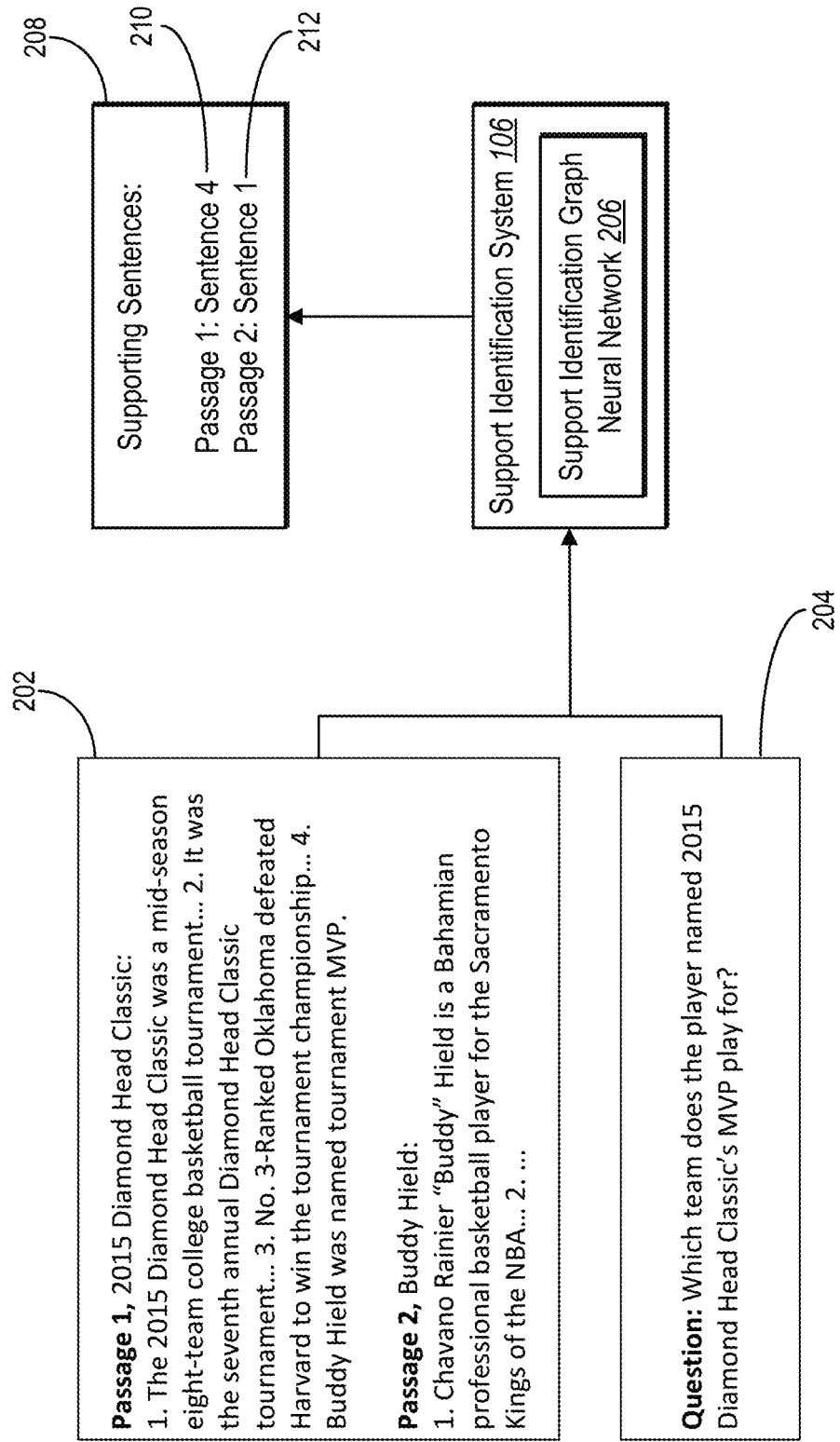
FIG. 2 illustrates a block diagram of a support identification system identifying supporting text phrases in accordance with one or more embodiments.

As mentioned above, the support identification system 106 can identify supporting text phrases that are relevant for responding to a query. FIG. 2 illustrates a block diagram of the support identification system 106 identifying supporting text phrases in accordance with one or more embodiments. As shown in FIG. 2, the support identification system 106 identifies a plurality of text phrases 202. In one or more embodiments, the support identification system 106 identifies the plurality of text phrases 202 by receiving the plurality of text phrases 202 from an external source, such as a third-party system or a client device. In some embodiments, the support identification system 106 identifies the plurality of text phrases 202 from a database storing text phrases. As shown in FIG. 2, the plurality of text phrases 202 can be included in a plurality of passages of text (e.g., various documents in a repository of documents). In some embodiments, however, the plurality of text phrases 202 can include various text phrases within the same passage of text.

As further shown in FIG. 2, the support identification system 106 also identifies a query 204. In one or more embodiments, the support identification system 106 identifies the query by receiving the query from an external source, such as a client device.

As illustrated by FIG. 2, the support identification system 106 utilizes a support identification graph neural network 206 to analyze the plurality of text phrases 202 and the query 204. Indeed, in one or more embodiments, the support identification system 106 utilizes the support identification graph neural network 206 to determine the relevance of the plurality of text phrases 202 to the query 204 (i.e., whether a given text phrase includes information that is useful or necessary in responding to the query 204). In some embodiments, the support identification system 106 generates and provides, to the support identification graph neural network 206, a graph topology corresponding to the plurality of text phrases 202 and the query 204. The support identification system 106 can then utilize the support identification graph neural network 206 to analyze the plurality of text phrases 202 and the query 204 based on the graph topology. Generating a graph topology will be discussed in more detail below with regard to FIG. 3.

As shown in FIG. 2, based on the analysis of the plurality of text phrases 202 and the query 204, the support identification system 106 identifies supporting text phrases 208. Indeed, in one or more embodiments, the supporting text phrases 208 include text phrases from the plurality of text phrases 202 that include information that is useful or necessary in responding to the query 204. Though FIG. 2 shows a certain number of identified supporting text phrases, the support identification system 106 can identify more or fewer supporting text phrases.

As further shown in FIG. 2, the supporting text phrases 208 includes text phrases from various passages. For example, the supporting text phrases 208 include a first supporting text phrase 210 from a first passage and a second supporting text phrase 212 from a second passage. Though not explicitly shown, the support identification system 106 can also identify various supporting text phrases from within the same passage. Indeed, the support identification system 106 can identify supporting text phrases from various numbers of passages. Thus, the support identification system 106 can identify multiple supporting text phrases that can be used in responding to a query.

Figure 3:
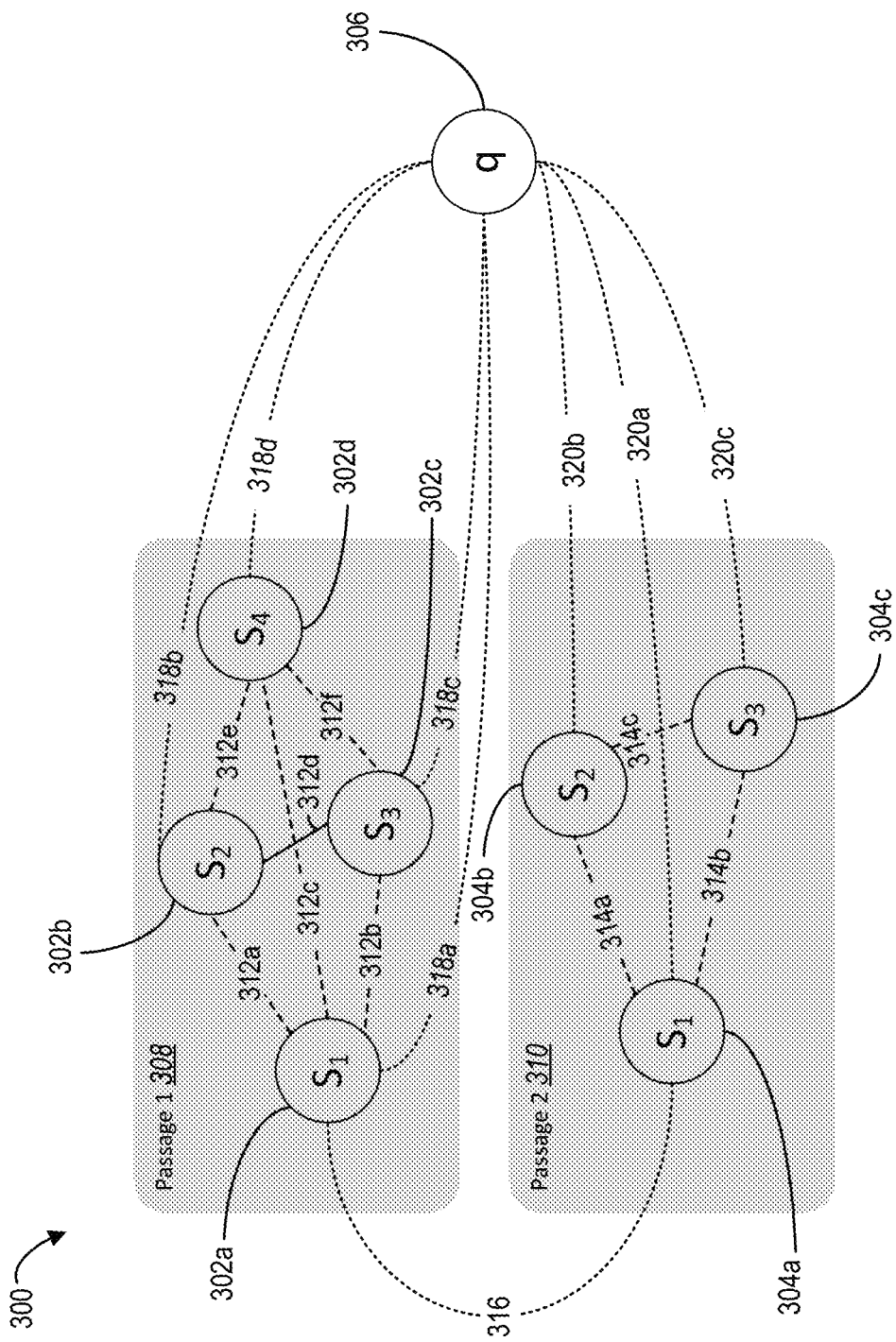
FIG. 3 illustrates a graph topology having a plurality of nodes corresponding to a plurality of text phrases and a query in accordance with one or more embodiments.

As mentioned above, in one or more embodiments, the support identification system 106 identifies supporting text phrases based on a graph topology corresponding to a plurality of text phrases and a query. Indeed, in one or more embodiments, the support identification system 106 generates the graph topology by generating edge connections between the plurality of text phrases and the query. The support identification system 106 can then use the graph topology to identify supporting text phrases (e.g., via a support identification graph neural network). FIG. 3 illustrates a schematic diagram of a graph topology 300 corresponding to a plurality of text phrases and a query in accordance with one or more embodiments.

As shown in FIG. 3, the support identification system 106 generates the graph topology 300 by generating a plurality of nodes corresponding to a plurality of text phrases and a query. In particular, as shown in FIG. 3, the support identification system 106 generates the text-phrase nodes 302a-302d (corresponding to a plurality of text phrases from a first passage 308) and generates the text-phrase nodes 304a-304c (corresponding to a plurality of text phrases from a second passage 310). Indeed, the support identification system 106 can generate text-phrase nodes corresponding to various numbers of text phrases from various numbers of passages. In one or more embodiments, the support identification system 106 generates a separate text-phrase node for each of the identified text phrases. Further, as shown, the support identification system 106 generates a query node 306 corresponding to the query. Though FIG. 3 specifically shows the graph topology 300 including text-phrase nodes corresponding to sentence-level text phrase (denoted as "S"), the graph topology 300 can include text-phrase nodes corresponding to various other levels of text phrases (e.g., words, groups of words, etc.).

Additionally, as shown in FIG. 3, the support identification system 106 generates the graph topology 300 by further generating edge connections between the plurality of nodes. In one or more embodiments, the support identification system 106 generates an edge connection between a pair of nodes to associate the nodes for the propagation of information (e.g., propagation of node representations) among nodes. Indeed, in one or more embodiments, the support identification system 106 can utilize a support identification graph neural network to share and receive information for a given node based on the edge connections between that node and one or more other nodes (i.e., connected nodes). Propagating information across the plurality of nodes of a graph topology will be discussed in more detail below with regard to FIGS. 4A-4F.

In one or more embodiments, the edge connections include undirected edge connections (i.e., bidirectional—information can be propagated between a pair of nodes in either direction). In some embodiments, however, the edge connections include directed (i.e., unidirectional) edge connections.

As shown in FIG. 3, the support identification system 106 generates the edge connections for the graph topology 300 by generating edge connections between text-phrase nodes corresponding to text phrases within the same passage. For example, the support identification system 106 generates the edge connections 312a-312f between the text-phrase nodes 302a-302d corresponding to the text phrases from the first passage 308. Additionally, the support identification system 106 generates the edge connections 314a-314c between the text-phrase nodes 304a-304c corresponding to the text phrases from the second passage 310.

As further shown in FIG. 3, the support identification system 106 generates an edge connection between text-phrase nodes corresponding to a selected text phrase of each passage (e.g., the edge connection 316 between the text-phrase node 302a and the text-phrase node 304a). In some embodiments (as shown), the support identification system 106 generates edge connections between nodes corresponding to a first text phrase from each passage. In other embodiments, the support identification system 106 can generate an edge connection between different nodes (e.g., nodes corresponding to the second text phrase in each passage, the longest text phrase in each passage, or the shortest text phrase in each passage). Moreover, in some embodiments, the support identification system 106 can generate edge connections between additional nodes corresponding to different passages (e.g., connect the first two/three nodes from each passage, the longest two/three nodes from each passage, the shortest two/three nodes from passage, or all the nodes from each passage).

Additionally, as shown in FIG. 3, the support identification system 106 generates edge connections between the query node 306 and the text-phrase nodes corresponding to the plurality of text phrases. Specifically, the support identification system 103 generates the edge connections 318a-318d and 320a-320c between the query node 306 and the text-phrase nodes 302a-302d and 304a-304c, respectively.

As mentioned, although the graph topology shown in FIG. 3 illustrates a particular configuration of nodes and edge connections, the support identification system 106 can generate graph topologies having a variety of different configurations. For example, in one or more embodiments, the support identification system 106 generates, for a particular node, edge connections between that node and all other nodes in the graph topology. In some embodiments, the support identification system 106 only generates edge connections between text-phrase nodes based on the sequence of the corresponding text phrases (e.g., generates an edge connection between a first text-phrase node and a second text-phrase node if the corresponding first text phrase is followed by the corresponding second text phrase). In one or more embodiments, the support identification system 106 connects a subset of text phrase nodes to the query (e.g., connect the first nodes from each passage to the query node, connects the longest node from each passage to the query node, and/or connects the shortest node from each passage to the query node). Indeed, the support identification system 106 can generate graph topologies having more or less edge connections (e.g., add or remove an edge connection between a pair of nodes from the nodes illustrated in FIG. 3).

Figure 4A:
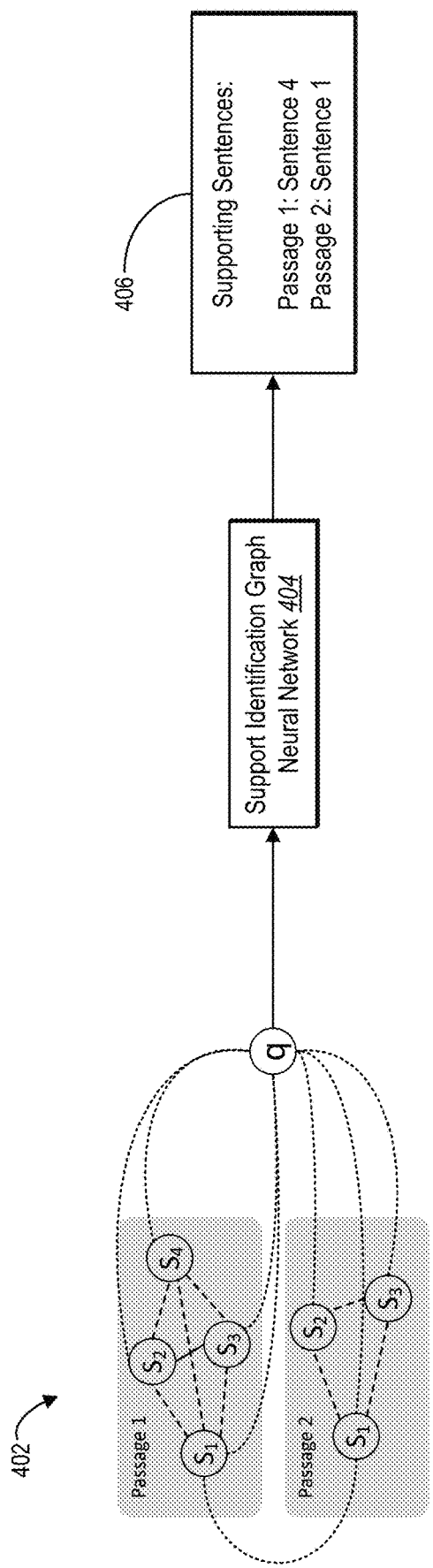
FIGS. 4A-4F illustrate diagrams of utilizing a support identification graph neural network to identify supporting text phrases in accordance with one or more embodiments.

As discussed above, the support identification system 106 can utilize a support identification graph neural network to identify supporting text phrases that are relevant to a query based on a graph topology. FIGS. 4A-4F illustrate diagrams showing the support identification system 106 utilizing a support identification graph neural network to analyze a graph topology in accordance with one or more embodiments. In particular, FIG. 4A provides an overview of using a support identification graph neural network to analyze a graph topology, while FIGS. 4B-4F provide additional detail regarding how the support identification graph neural network analyzes a particular node of the graph topology to identify whether or not the corresponding text-phrase qualifies as a supporting text phrase. It should be noted that the same methods of analyzing the particular node discussed in FIGS. 4B-4F can be used to analyze each node within the graph topology.

FIG. 4A illustrates a block diagram of the support identification system 106 utilizing a support identification graph neural network 404. As shown in FIG. 4A, the support identification system 106 generates a graph topology 402 and utilizes the graph topology 402 as part of the support identification graph neural network 404. In particular, the graph topology 402 corresponds to a plurality of text phrases and a query. In particular, the support identification system 106 generates the graph topology 402 to include a plurality of text-phrase nodes corresponding to the plurality of text-phrases, a query node corresponding to the query, and edge connections connecting various nodes as discussed above with reference to FIG. 3. As shown in FIG. 4A, the support identification system 106 utilizes the support identification graph neural network 404 to identify supporting text phrases 406 based on the graph topology 402.

Figure 4C:
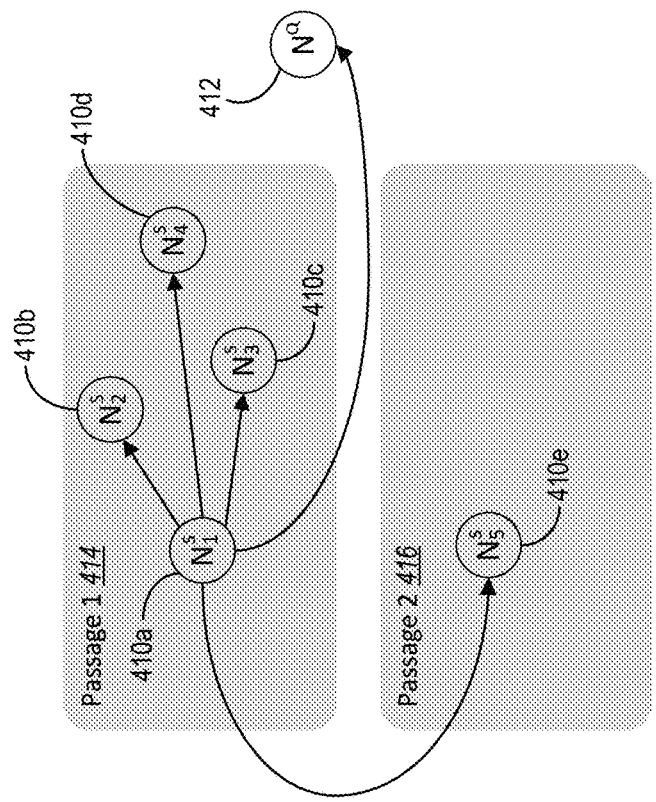
Figure 4B:
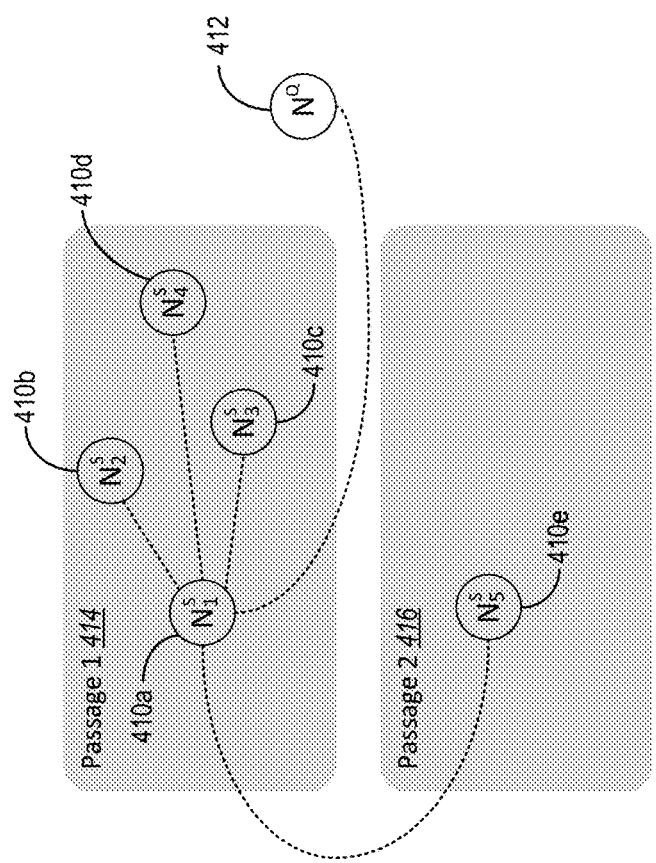

FIG. 4B illustrates a schematic diagram of a node from the graph topology 402 of FIG. 4A and the corresponding connected nodes in accordance with one or more embodiments. As shown in FIG. 4B, the text-phrase node 410a is connected (i.e., via edge connections) to the text-phrase nodes 410b-410d of a first passage 414, the text-phrase node 410e of a second passage 416, and a query node 412.

As shown in FIG. 4B, each of the nodes are associated with a node representation. Indeed, the text phrase nodes 410a-410e are associated with a corresponding text-phrase node representation (denoted $N_i^S$) and the query node 412 is associated with a query node representation (denoted $N^Q$). In one or more embodiments, the support identification system 106 utilizes a support identification graph neural network (e.g., the support identification graph neural network 404 of FIG. 4A) to generate the text-phrase node representations and the query node representation. More detail regarding generating node representations will now be provided.

Generally, in one or more embodiments, the support identification system graph neural network represents the query as $Q \in \mathbb{R}^{d \times Q}$ and each of the text phrases as $S_i \in \mathbb{R}^{d \times S_i}$ where d represents the dimensionality of the word embedding and Q and $S_i$ represent the lengths of the sequences in Q and $S_i$, respectively. In one or more embodiments, the support identification graph neural network processes Q and $S_i$ in order to acquire the respective text phrase-level information. In particular, the support identification system graph neural network can utilize a language embedding model as a word-embedding layer to capture the contextual meaning of words in the query and the various text phrase. For example, in one or more embodiments the support identification graph neural network utilizes the ELMo language model to determine the word embeddings as $L^Q=\text{ELMo}(Q)$ and $L^{S_i}=\text{ELMo}(S_i)$ for the query and the various text phrases, respectively. Using the word embeddings, the support identification graph neural network can generate text-phrase embeddings corresponding to the plurality of text phrases and a query embedding corresponding to the query as follows where $f_\theta$ represents an RNN function with the weight parameter θ:

$$h_t^{S_i}=f_\theta(h_{t-1}^{S_i}, L_t^{S_i}) \tag{1}$$

$$h_t^Q=f_\theta(h_{t-1}^Q, L_t^Q) \tag{2}$$

In one or more embodiments, the support identification graph neural network uses the embeddings determined using the above equations to determine node representations for the various nodes. In particular, the support identification graph neural network can use the text-phrase embedding corresponding to a particular text phrase as the text-phrase node representation for that text-phrase and the query embedding as the query node representation corresponding to the query as follows:

$$N_i^S=h_{last}^{S_i} \tag{3}$$

$$N^Q=h_{last}^Q \tag{4}$$

In the above equations, $N^{S_i} \in \mathbb{R}^{d'}$ and $N^Q \in \mathbb{R}^{d'}$ represent node representations for a given text phrase and the query, respectively. Thus, the support identification system 106 can utilize the support identification graph neural network to generate node representations corresponding to the plurality of text phrases and the query.

In one or more embodiments, after determining the node representations, the support identification graph neural network propagates the node representations among the different nodes of the graph topology. FIG. 4C illustrates a schematic diagram of the support identification graph neural network propagating the text-phrase node representation ($N_1^S$) of the text-phrase node 410a to the text-phrase nodes 410b-410e and the query node 412 in accordance with one or more embodiments. Indeed, in one or more embodiments, the support identification graph neural network propagates the node representation of a particular node to all nodes connected to that particular node via an edge connection. In one or more embodiments, the support identification graph neural network applies attention weights to the node representation to propagate the node representation to the connected nodes. Additional detail regarding propagating node representations using attention weights is provided below (e.g., in relation to FIG. 4D) As shown in FIG. 4C, however, the support identification graph neural network can use the text-phrase node representation of the text-phrase node 410a to update the text-phrase node representations of the text-phrase nodes 410b-410e and the query node representation of the query node 412.

Figure 4E:
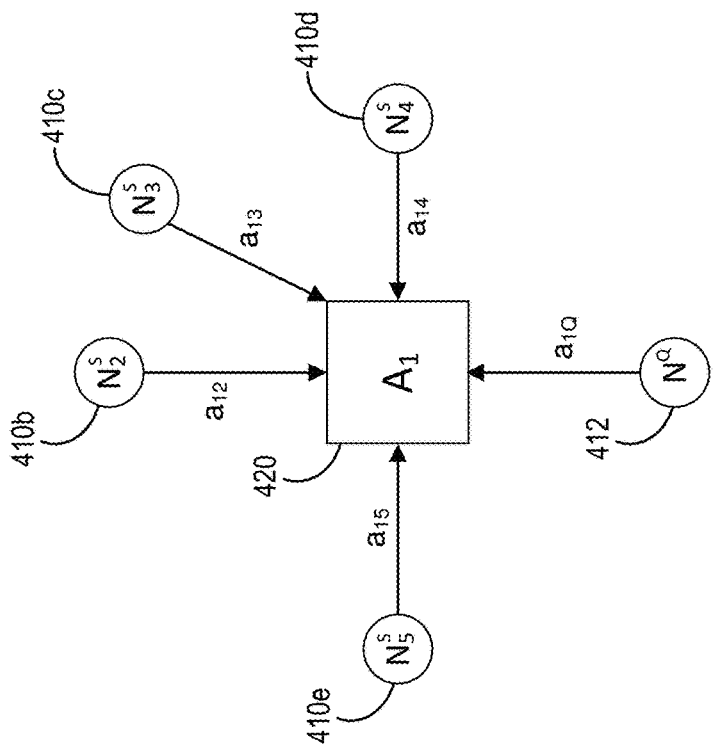
Figure 4D:
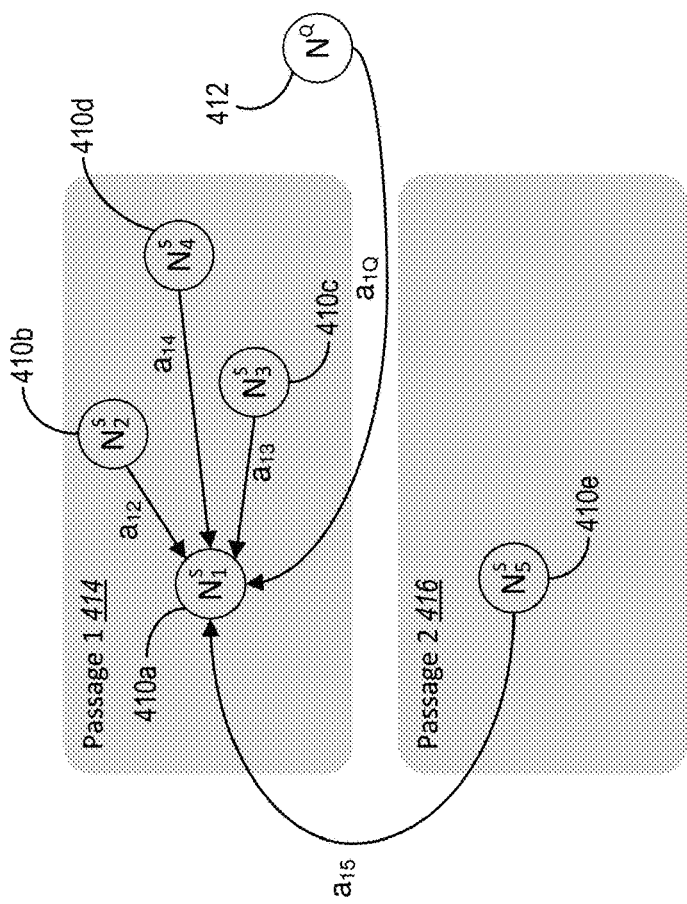

In some embodiments, in addition to propagating a node representation from a given node, the support identification graph neural network also propagates node representations (e.g., weighted node representations) to that given node. In other words, the support identification graph neural network can send node representations both to and from connected nodes within a graph topology. FIG. 4D illustrates a schematic diagram of the support identification graph neural network propagating node representations to the text-phrase node 410a from connected nodes in accordance with one or more embodiments. In particular, the support identification graph neural network propagates the text-phrase node representations of the text-phrase nodes 410b-410e and the query node representation of the query node 412 to the text-phrase node 410a.

As shown in FIG. 4D, the support identification graph neural network can apply attention weights (denoted $a_{1,u}$) to the node representations propagated to the text-phrase node 410a. Indeed, the support identification graph neural network can generate an attention weight for each pairing of nodes that includes the text-phrase node 410a and a connected node. In one or more embodiments, the support identification graph neural network generates an attention weight for a pairing of nodes by determining a similarity measure between the nodes in the pairing and then generating the attention weight based on the determined similarity measure. In particular, the support identification system 106 can compare two node representations and apply a learned edge weight from the support identification graph neural network to determine a similarity measure between the nodes. The supporting identification system can utilize the similarity measure to generate the attention weight. More detail regarding determining similarity measures and generating attention weights will now be provided.

In one or more embodiments, the support identification graph neural network utilizes an attentive aggregation function to determine the amount of information to be propagated to a node of a graph topology. As part of implementing the attentive aggregation function, the support identification graph neural network can determine similarity measures and generate attention weights for pairs of nodes as follows:

$$S_{vu}^{(k)}=(N_v^{(k)})^T \cdot W^{(k)} \cdot N_u^{(k)} \quad (5)$$

$$a_{vu}^{(k)}=\exp(S_{vu})/\Sigma_k \exp(S_{vk}) \quad (6)$$

In equation 5, $S_{vu}$ represents a similarity measure between the v-th node and a corresponding connected node u where $u \in N(v)$ and $N_u \in \mathbb{R}^{d'}$ is the u-th node representation. Additionally, in equation 5, $W \in \mathbb{R}^{d' \times d'}$ is a parameter of the support identification graph neural network learned during the training process (i.e., a learned edge weight). In equation 6, $a_{vu}$ represents the attention weight between the v-th node and the u-th node. As shown in equation 6, the support identification graph neural network generates the attention weight $a_{vu}$ based on the similarity measure $S_{vu}$. Moreover, as shown in equation 5, the similarity measure reflects a comparison between the node pairs (e.g., the dot product) as well as the learned edge weight. In both equations, k represents a particular iteration of propagation. Indeed, as will be discussed in more detail below, the support identification graph neural network can iteratively propagate (and update) node representations corresponding to nodes in order to accurately identify supporting text phrases.

After determining the attention weights associated with a node (i.e., associated with pairings that include the node and a corresponding connected node), the support identification graph neural network can generate a modified node representation corresponding to the node. FIG. 4E illustrates a schematic diagram of the support identification graph neural network generating a modified node representation corresponding to the text-phrase node 410a in accordance with one or more embodiments. As shown in FIG. 4E, the support identification graph neural network can generate the modified node representation 420 (denoted $A_1$) for the text-phrase node 410a based on the text-phrase node representations of the text-phrase nodes 410b-410e, the query node representation of the query node 412, and the associated attention weights. More detail regarding generating modified node representations will now be provided.

As mentioned above, the support identification graph neural network can utilize an attentive aggregation function to determine the amount of information to be propagated to a node of a graph topology (i.e., the modified node representation). In particular, using equations 5 and 6, the support identification graph neural network can determine attention weights between pairs of nodes. Subsequently, the support identification graph neural network can generate a modified node representation corresponding to a particular node based on the attention weights associated with that node (i.e., associated with the pairings of the node and a corresponding connected node) as follows:

$$A_v^{(k)}=\sigma(\Sigma_{u \in N(v)} a_{vu}^{(k)} W^{(k)} \cdot N_u^{(k)}) \quad (7)$$

In equation 7, $A_v \in \mathbb{R}^{d'}$ and represents the aggregated information for the v-th node (i.e., the modified node representation) computed by the attentive weighted summation of the connected nodes corresponding to that node. Further, a is a nonlinear activation function. Indeed, as shown in FIG. 7, the support identification graph neural network can generate the modified node representation corresponding to a particular node based on the learned edge weight W and the connected node representations $N_u$ in addition to the attention weights.

Figure 4F:
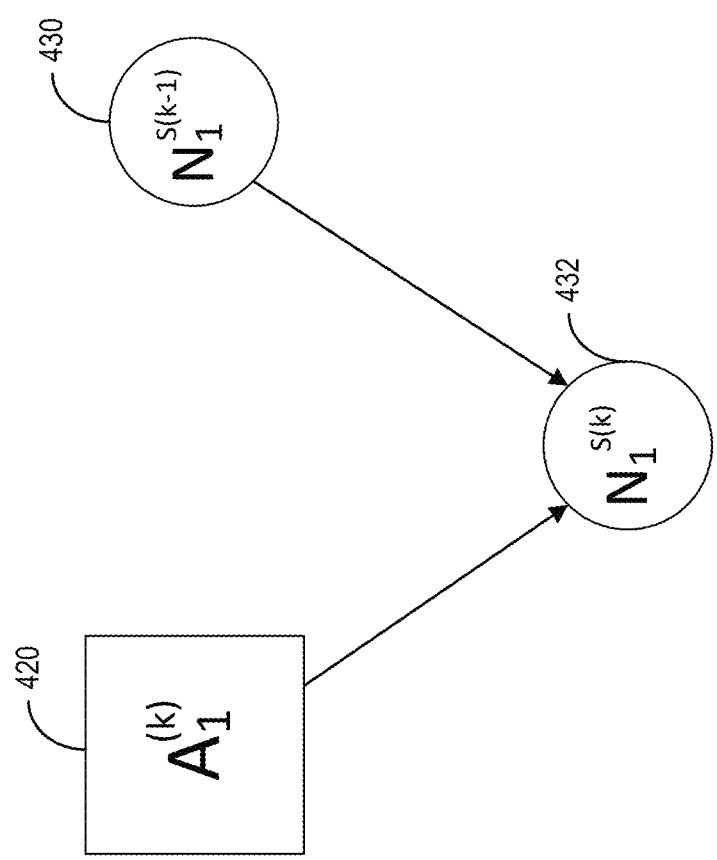

The support identification graph neural network can utilize the modified node representation corresponding to a given node to update the node representation of that node. FIG. 4F illustrates a schematic diagram of the support identification graph neural network updating a node representation of the text-phrase node 410a in accordance with one or more embodiments. As shown in FIG. 4F, the support identification graph neural network generates an updated node representation 432 for the text-phrase node 410a based on the modified node representation 420 and the current state (i.e., current node representation 430) of the text-phrase node. The support identification graph neural network then utilizes the updated node representation 432 as the new node representation for the text-phrase node 410a. More detail regarding updating states of node representations (i.e., generating updated node representations) will now be provided.

In one or more embodiments, the support identification graph neural network utilizes a skip connection to determine the amount of information to be updated (i.e., the degree to which the node representation of a particular node will be updated). Indeed, the support identification graph neural network can generate the updated node representation as follows:

$$N_v^{(k)}=\sigma(W \cdot \{N_v^{(k-1)}; A_v^{(k)}\}) \quad (8)$$

In equation 8, σ represents a nonlinear activation function, {;} represents vector concatenation, and $W \in \mathbb{R}^{d' \times 2d'}$ is a parameter of the support identification graph neural network learned during the training process (i.e., a learned update weight). Indeed, the learned update weight W of equation 8 is a different learned parameter than the learned edge weight utilized in equations 5 and 7. Thus, as indicated by equation 8, the support identification system 106 can update a node representation corresponding to a particular node based on the current node representation, the modified node representation, and the learned update weight.

In some embodiments, the support identification graph neural network utilizes a machine learning model, such as a neural network, to update node representations. For example, the support identification graph neural network can use a neural network to analyze the current node representation of a given node and the corresponding modified node representation and update the node representation of the node based on the analysis. Indeed, in some embodiments, the support identification neural network utilizes one of various other models capable of determining an interpolation factor useful for updating node representations. Thus, the support identification system 106 can utilize the support identification graph neural network to update node representations corresponding to text-phrases and queries based on the node representations of connected nodes.

As mentioned above, the support identification system 106 can utilize the support identification graph neural network to iteratively propagate and update node representations of nodes within a graph topology that correspond to text phrases and a query. Indeed, for a given node, the support identification graph neural network can iteratively propagate the connected node representations of the connected nodes to that node, determine the similarities between the node representation of the node and the connected node representations of the connected nodes, generate attention weights associated with the node, generate a modified node representation corresponding to the node, and then generate an updated node representation for the node. Similarly, the support identification graph neural network can iteratively propagate the node representation of the node to the connected nodes in order to update the node representations for those nodes.

By iteratively updating the node representation for a given node based on connected node representations, the support identification graph neural network can update the node representation based on nodes that are not directly connected to the node within the graph topology. Indeed, in one or more embodiments, as the support identification graph neural network updates the node representation of a first node, the support identification graph neural network also updates the node representations of other nodes within the graph topology. In particular, the support identification graph neural network can update the other nodes in a similar manner (i.e., based on the connected node representations of their respective connected nodes, which may include nodes that are not connected to the first node via an edge connection). Thus, with each iteration, the support identification graph neural network updates a node representation based on connected node representations that were previously updated by other node representations. In other words, the support identification graph neural network can gradually propagate the node representation of a node to various other nodes within a graph topology, even to those nodes to which the node is not directly connected.

In one or more embodiments, the support identification system 106 configures the support identification graph neural network to perform a pre-determined number of iterations for propagating and updating node representations. In some embodiments, however, the support identification system 106 configures the support identification graph neural network to iteratively propagate and update node representations until convergence is reached.

In one or more embodiments, after the support identification graph neural network completes the iterative propagation and updating of node representations, the support identification system 106 can further use the support identification graph neural network to identify supporting text phrases. For example, in some embodiments, the support identification graph neural network determines a similarity measure between each finalized text-phrase node representation and the finalized query node representation. The support identification graph neural network can then classify whether a text phrase qualifies as a supporting text phrase based on the similarity measure between the corresponding finalized text-phrase node and the finalized query node. In one or more embodiments, the support identification graph neural network provides a probability that a text phrase qualifies as a supporting text phrase. The support identification system 106 can then use text phrases having the highest probabilities as the supporting text phrases or text phrases having a probability that satisfies a required threshold probability as the supporting text phrases.

By utilizing a support identification graph neural network to iteratively propagate and update node representations, the support identification system 106 can operate more accurately than conventional systems. Indeed, by iteratively propagating node representations, the support identification system 106 can determine the relationship between text phrases within a passage or text phrases across several passages. Further, the support identification system 106 can determine the relationship between text phrases and the query. Indeed, by propagating information corresponding to a particular text phrase across a graph topology, the support identification system 106 can accurately determine whether that text phrase is relevant for responding to a query even when the relevance of the text phrase depends on one or more other text phrases.

Thus, in one or more embodiments, the support identification system 106 identifies a plurality of text phrases and a query and further identifies which text phrases are relevant for responding to the query. In particular, the support identification system 106 can utilize a support identification graph neural network to identify the supporting text phrases. The algorithms and acts described with reference to FIGS. 4A-4F can comprise the corresponding acts and algorithms (e.g., structure) for performing a step for utilizing the support identification graph neural network to identify a supporting text phrase relative to the query from the plurality of text phrases.

Figure 5A:
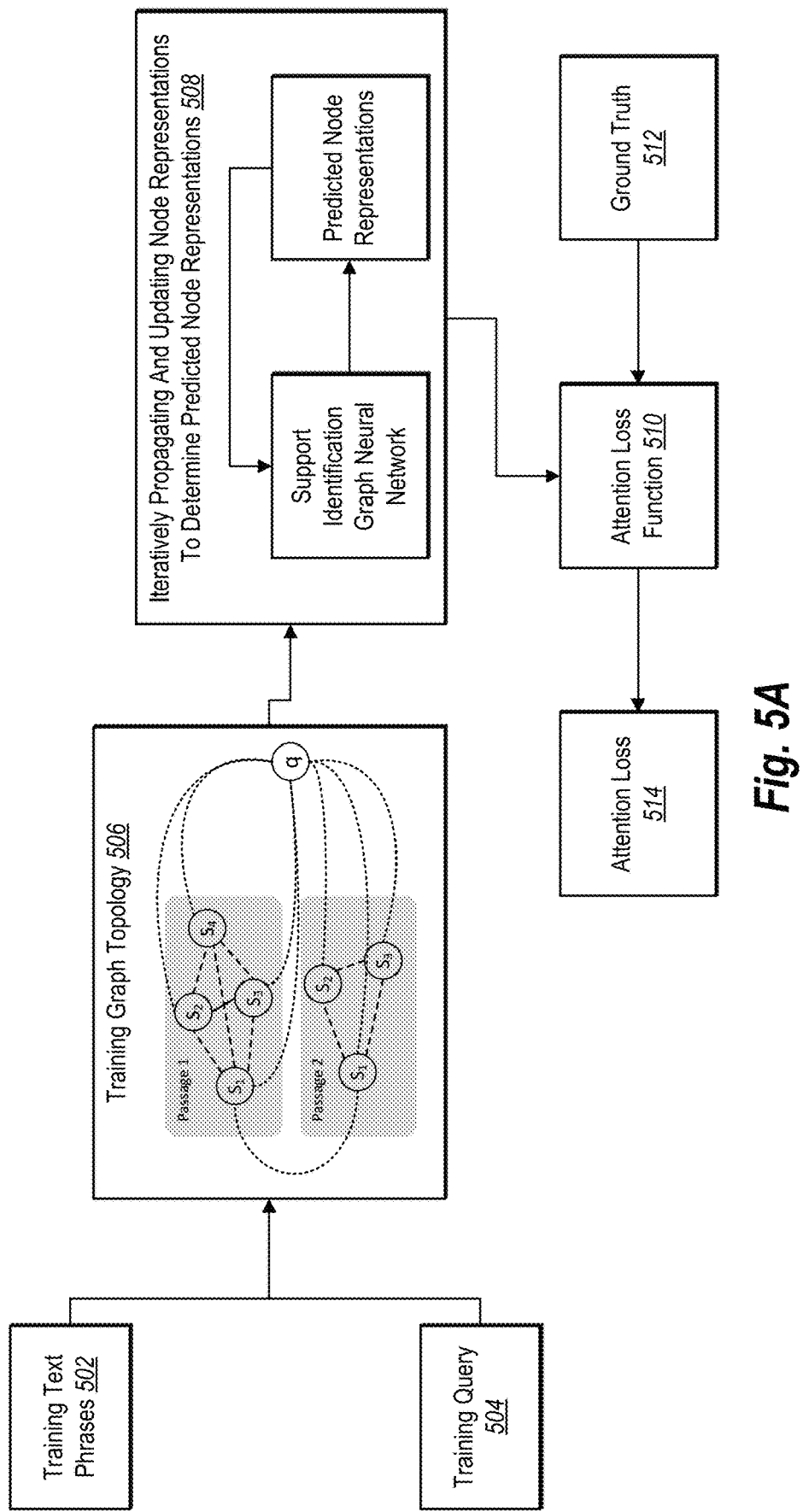
FIGS. 5A-5C illustrate a block diagram for training a support identification graph neural network to identify supporting text phrases in accordance with one or more embodiments.
Figure 5B:
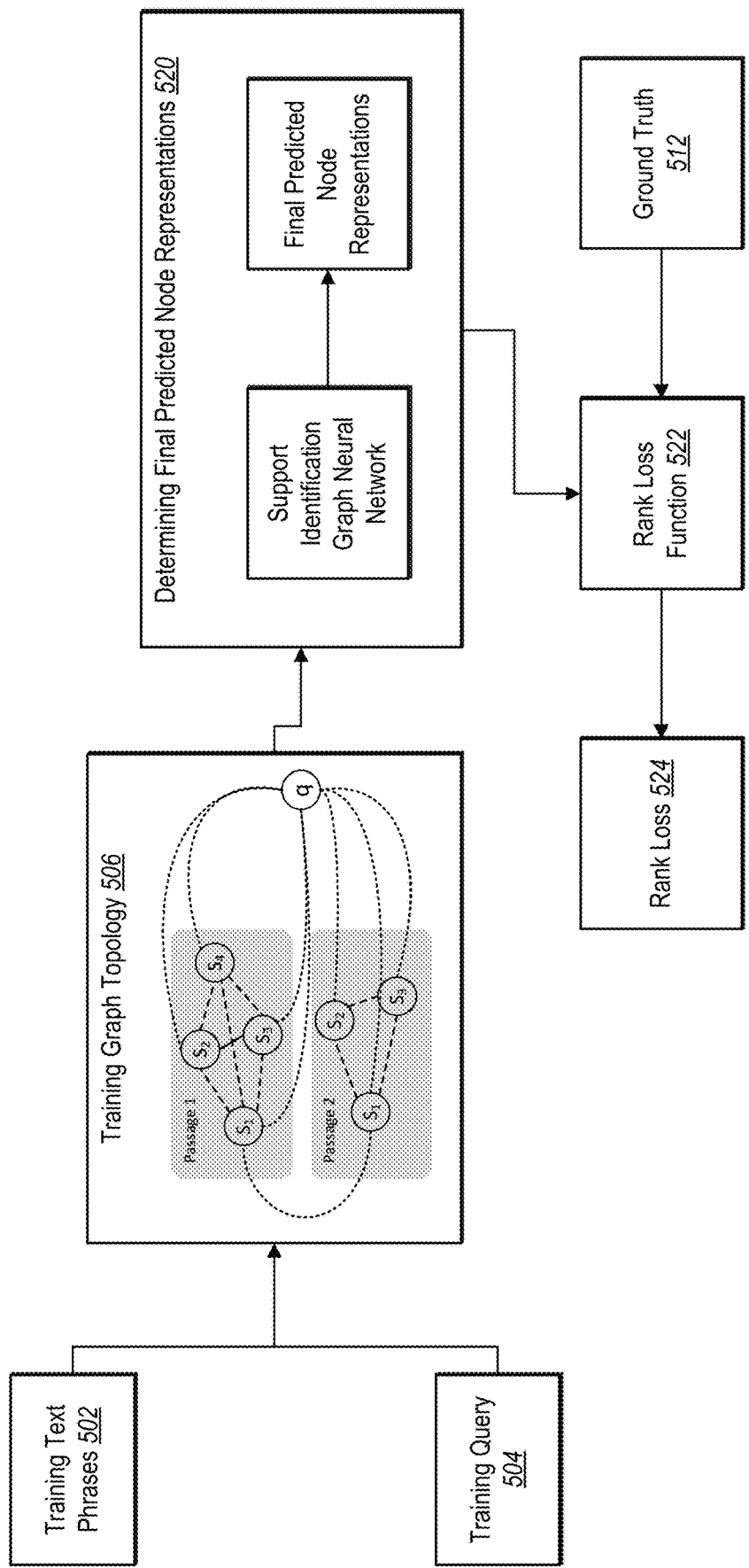
Figure 5C:
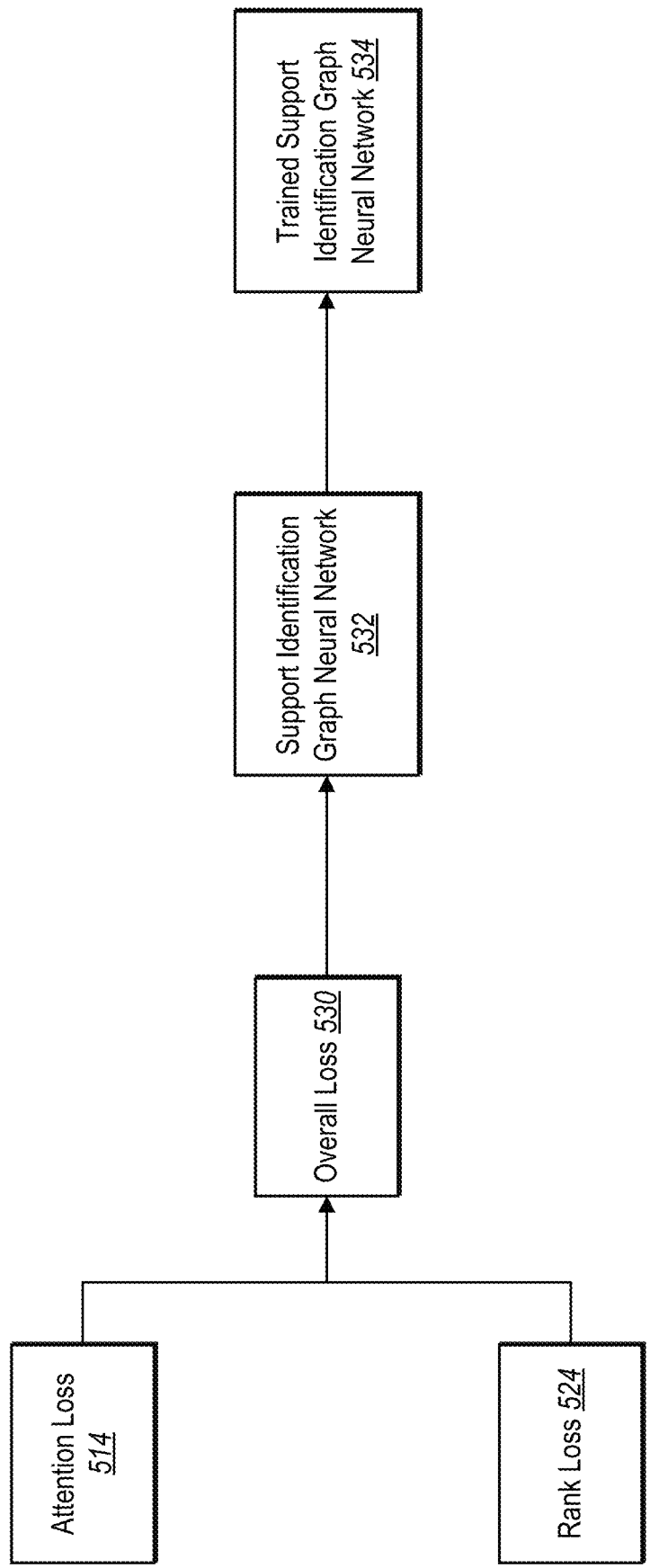

As mentioned above, the support identification system 106 can train a support identification graph neural network to identify supporting text phrases from a plurality of text phrases. Indeed, in one or more embodiments, the support identification system 106 can train the support identification graph neural network using various losses. FIGS. 5A-5C illustrate a block diagram of training a support identification graph neural network to identify supporting text phrases in accordance with one or more embodiments.

In particular, FIG. 5A illustrates a block diagram of the support identification system 106 utilizing training text phrases 502 and a training query 504 to obtain an attention loss 514. For example, as shown, the support identification system 106 utilizes the training text phrases 502 and the training query 504 to generate a training graph topology 506. The training graph topology 506 includes a plurality of nodes corresponding to the training text phrases 502 and the training query 504. Indeed, in one or more embodiments, the support identification system 106 generates the training graph topology 506 in accordance with the discussion above with regard to FIG. 3.

As shown in FIG. 5A, the support identification system 106 then performs an act 508 of iteratively propagating and updating node representations to determine predicted node representations. Indeed, in one or more embodiments, the support identification system 106 utilizes a support identification graph neural network to determine node representations corresponding to the plurality of nodes and then propagate and update those node representations as discussed above with reference to FIGS. 4A-4F. In one or more embodiments, the support identification system 106 determines a predicted node representation for each node at each iteration.

As illustrated in FIG. 5A, the support identification system 106 then utilizes an attention loss function 510 and a ground truth 512 to determine the attention loss 514 based on the predicted node representations determined at each iteration (or at every other iteration or another iteration interval). Indeed, in one or more embodiments, the support identification system 106 determines the attention loss 514 based on multiple iterations of propagating and updating node representations, using the node representations of each iteration to contribute to the attention loss. In one or more embodiments, the attention loss function 510 includes the following:

$$\text{loss}_{attn} = -\log \Sigma_{i=1}^{k} \Pi_{i=1}^{N} Y_i \log(a_{qi}^{(k)}) \qquad (9)$$

In equation 9, $a_{qi}^{(k)}$ represents the relevance between the question node and the i-th text-phrase node of the training graph topology 506 determined at the k-th iteration. In one or more embodiments, the support identification system 106 determines the value of $a_{qi}^{(k)}$ using equations 5 and 6 discussed above. Further, in equation 9, $Y_i$ represents a ground truth. In one or more embodiments, $Y_i$ includes a binary label indicating whether or not the text phrase corresponding to the i-th text-phrase node includes a supporting text-phrase. In one or more embodiments, the ground truth 512 includes $Y_i$ corresponding to the various training text phrases 502.

FIG. 5B illustrates a block diagram of the support identification system 106 utilizing the support identification graph neural network to analyze the training graph topology 506 and determine a rank loss. As shown in FIG. 5B, the support identification system 106 performs an act 520 of determining final predicted node representations. Indeed, the final predicted node representations can include the node representations corresponding to the plurality of nodes after the support identification graph neural network completes the process of iteratively propagating and updating node representations.

As shown in FIG. 5B, the support identification system 106 utilizes a rank loss function 522 and the ground truth 512 to determine the rank loss 524 based on the final predicted node representations. In one or more embodiments, the rank loss function 522 includes the following:

$$\text{score}_i = g_\theta(N_i^Q, N_i^S) \quad (10)$$

$$S = [\text{score}_1, \ldots, \text{score}_i] \quad (11)$$

$$\text{loss}_{rank} = -\log \Pi_{i=1}^{N} Y_i \log(S_i) \quad (12)$$

In equation 10, $g_\theta$ represents a feedforward network that computes a similarity score between the final representation of the query and each text phrase. In one or more embodiments, $g_\theta$ represents a pre-trained feedforward network. As shown by the above equations, the support identification system 106 can determine the rank loss 524 based on the predicted similarity (between each of the finalized text-phrase node representations and the query node representation) and the ground truth, $Y_i$. As mentioned above, in one or more embodiments, $Y_i$ includes a binary label indicating whether or not the text phrase corresponding to the i-th text-phrase node includes a supporting text-phrase. Accordingly, the loss rank can reflect a comparison between the predicted similarity (between each final text phrase node representation and the final query node representation) and the ground truth.

FIG. 5C illustrates a block diagram of utilizing the attention loss 514 and the rank loss 524 to train the support identification graph neural network 532. Indeed, as shown, the support identification system 106 combines the attention loss 514 and the rank loss 524 to determine the overall loss 530. In one or more embodiments, the support identification system 106 determines the overall loss 530 using the following where α represents a hyperparameter:

$$\mathcal{L} = \alpha \, \text{loss}_{rank} + \text{loss}_{attn} \quad (13)$$

The support identification system 106 can utilize the overall loss 530 to modify the parameters of the support identification graph neural network 532 (e.g., via back propagation). Consequently, with each iteration of training, the support identification system 106 can gradually increase the accuracy with which the support identification graph neural network can identify supporting text phrases. As shown, the support identification system 106 can thus generate the trained support identification graph neural network 534.

Though FIGS. 5A-5C illustrate the support identification system 106 utilizing multiple losses in training the support identification graph neural network, one or more embodiments can utilize more or fewer losses. Further, though FIGS. 5A-5C illustrate the support identification system 106 utilizing a rank loss and an attention loss, this is merely exemplary. The support identification system 106 can utilize one or more of a variety of losses to train the support identification graph neural network.

Thus, in one or more embodiments, the support identification system 106 trains a support identification graph neural network to identify supporting text phrases that are relevant to a query. The algorithms and acts described with reference to FIGS. 5A-5C can comprise the corresponding acts and algorithms (e.g., structure) for performing a step for training a support identification graph neural network to identify supporting text phrases relevant to queries.

Figure 6:
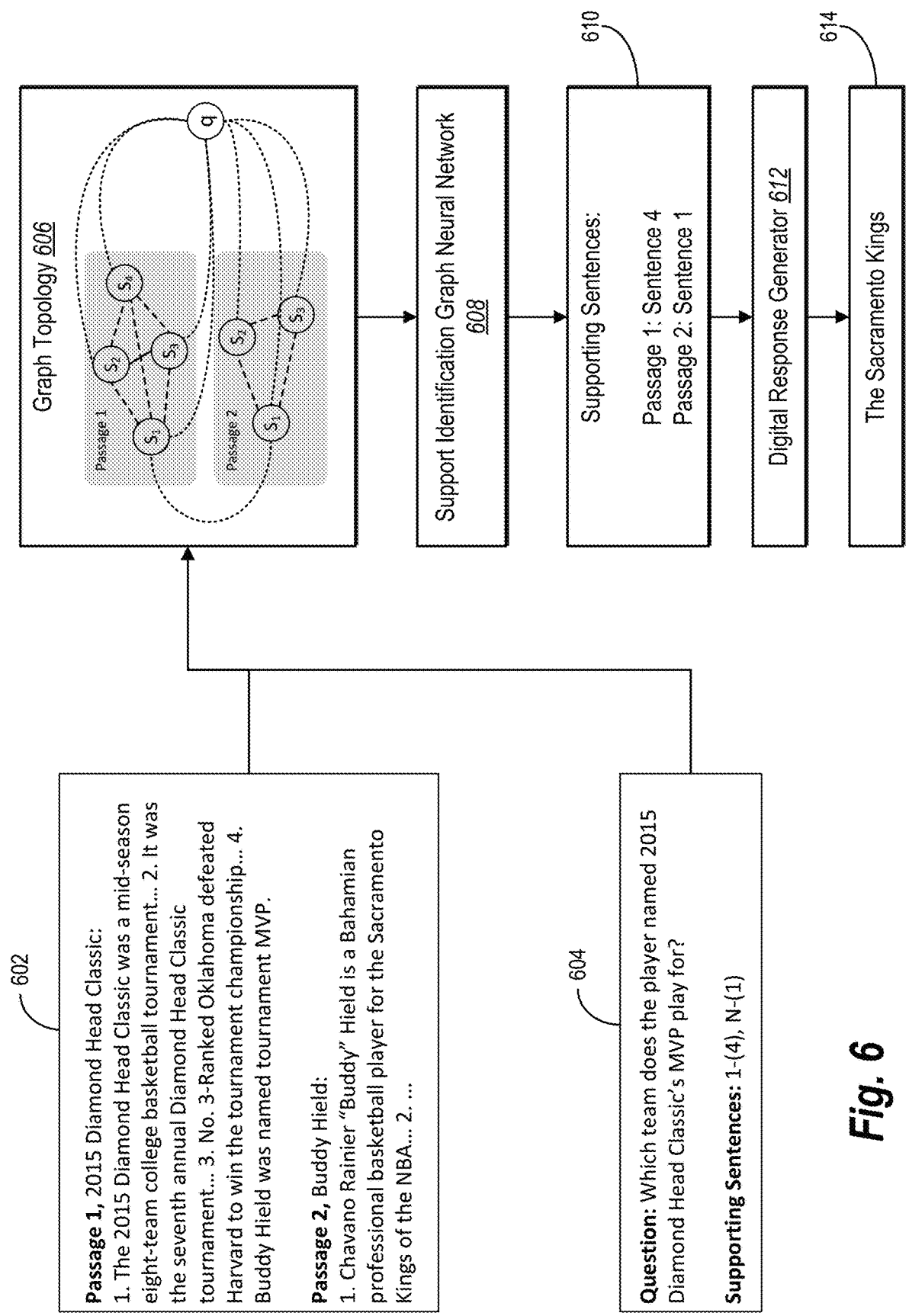
FIG. 6 illustrates a block diagram of generating a digital response to a query in accordance with one or more embodiments.

As mentioned above, in one or more embodiments, the support identification system 106 generates digital responses to queries based on the identified supporting text phrases. FIG. 6 illustrates a block diagram of generating a digital response to a query in accordance with one or more embodiments. As shown in FIG. 6, the support identification system 106 generates a graph topology 606 based on a plurality of text phrases 602 and a query 604. The support identification system 106 then utilizes a support identification graph neural network 608 to identify supporting text phrases 610 based on the graph topology 606. Subsequently, the support identification system 106 utilizes a digital response generator 612 to generate the digital response 614 to the query 604.

In one or more embodiments, the digital response generator 612 generates digital responses as described by G. Shen et al., *Inter-weighted Alignment Network for Sentence Pair Modeling*, In Proceedings of the 2017 Conference on Empirical Methods in Natural Language Processing, 2017, which is incorporated herein by reference in its entirety. In some embodiments, the digital response generator 612 generates digital responses as described by S. Wang and J. Jiang, *A Compare-aggregate Model for Matching Text Sequences*, 2016, https://arxiv.org/abs/1611.01747, which is incorporated herein by reference in its entirety.

Figure 8A:
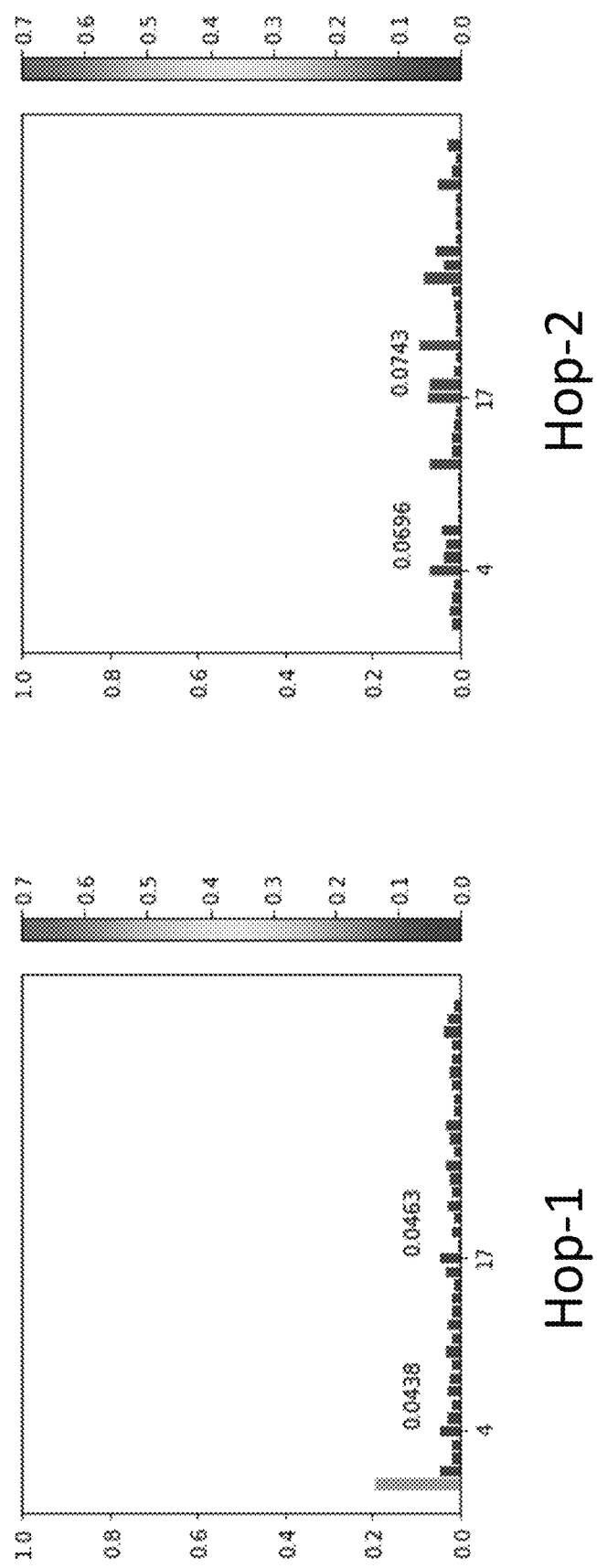
FIGS. 8A-8B illustrate graphs reflecting further experimental results regarding the effectiveness of the support identification system in accordance with one or more embodiments.
Figure 8B:
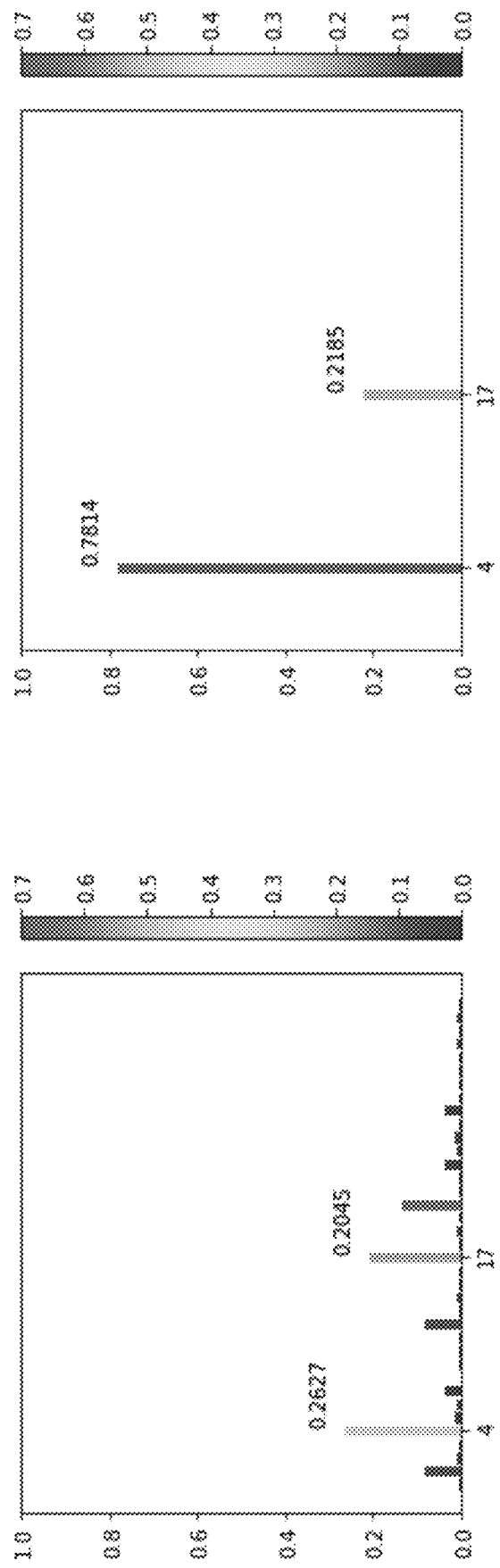

As mentioned above, utilizing a support identification graph neural network can allow the support identification system 106 to operate more accurately than conventional systems. Researchers have conducted studies to determine the accuracy of one or more embodiments of the support identification system 106. FIGS. 7 and 8A-8B illustrate experimental results reflecting the performance of the support identification system 106 in accordance with one or more embodiments.

In particular, FIG. 7 illustrates a table reflecting experimental results based on the performance of multiple embodiments of the support identification system 106. Specifically, the table reflects the performance of the support identification system 106 on the HotpotQA dataset, which provides training and validation subsets (referred to as "trainset" and "devset," respectively). While training the support identification graph neural network, the researchers implemented early termination. Further, the researchers performed optimization using the Adam optimization algorithm, including gradient clipping by norm at a threshold of five.

The table shown in FIG. 7 compares the performance of one embodiment of the support identification system 106 utilizing ELMo to generate word embeddings as discussed above (PS-elmo), one embodiment that utilizes a small version of ELMo (PS-elmo-small), one embodiment that replaces ELMo with GloVe as the language embedding model (PS-rnn), and another embodiment that employs average pooling instead of RNN encoding in equations 1 and 2 (PS-avg where $N^Q$=average(Q) and $N^S$=average(S)).

Additionally, the table shown in FIG. 7 compares the performance of the support identification system 106 with the performance other methods of determining digital responses to a query typically used by conventional systems. For example, the results also measure the performance of several answer-selection models, such as the inter-weighted alignment network (IWAN), the compare-aggregate model (CompAggr), the context-dependent additive recurrent neural net (sCARNN), and the compare-aggregate model with dynamic-clip attention (CompClip). These models were primarily developed to rank candidate answers for a given question.

As shown in FIG. 7, the results compare the performance of each method using mean average precision (MAP) and mean reciprocal rank (MRR) metrics. As can be seen, the support identification system 106 generally performs better than the other compared models. Notably, the PS-elmo embodiment of the support identification system 106 performed significantly better than the other models on the validation subset, scoring a 0.734 MAP and 0.853 MRR. Further, the PS-rnn model performed better than the other models on the training subset, scoring a 0.919 MAP and 0.971 MRR.

FIGS. 8A-8B each illustrate graphs plotting the attention weights generated between pairs of nodes that include a query node and a text-phrase node. In particular, the graphs of FIGS. 8A-8B show the attention weights as the support identification graph neural network progresses through several "hops" (i.e., iterations) of propagating and updating node representations. As shown in FIGS. 8A-8B, the support identification graph neural network applies greater weight to text phrase four and text phrase seventeen as the number of iterations increases. Thus, by iteratively propagating node representations utilizing a support identification graph neural network, the support identification system 106 can accurately identify which text phrases from a plurality of text phrases are relevant for responding to a query.

Figure 9:
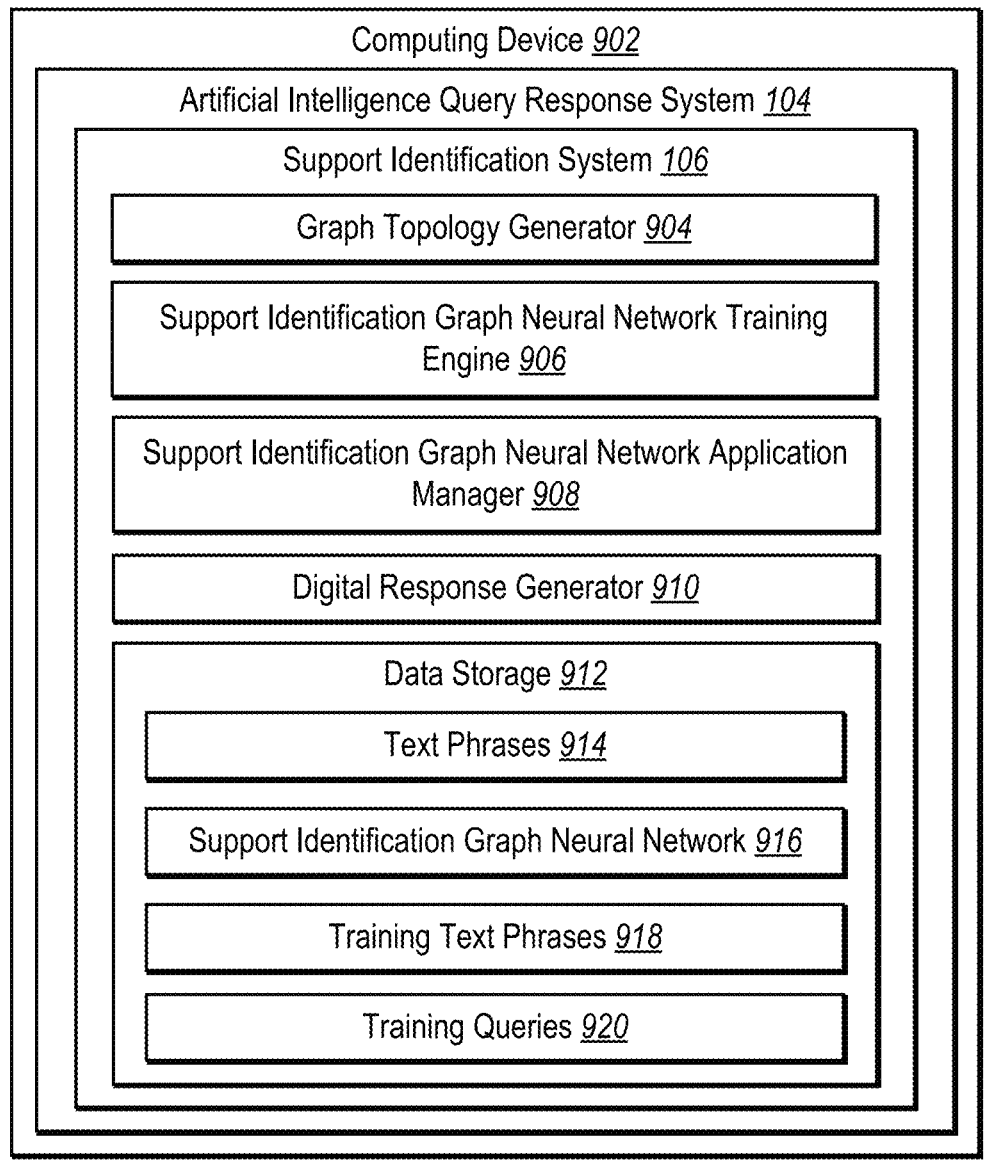
FIG. 9 illustrates an example schematic diagram of a support identification system in accordance with one or more embodiments.

Turning now to FIG. 9, additional detail will be provided regarding various components and capabilities of the support identification system 106. In particular, FIG. 9 illustrates the support identification system 106 implemented by the computing device 902 (e.g., the server(s) 102 and/or the client device 110a as discussed above with reference to FIG. 1). Additionally, the support identification system 106 is also part of the artificial intelligence query response system 104. As shown the support identification system 106 can include, but is not limited to, a graph topology generator 904, a support identification graph neural network training engine 906, a support identification graph neural network application manager 908, a digital response generator 910, and data storage 912 (which includes text phrases 914, a support identification graph neural network 916, training text phrases 918, and training queries 920).

As just mentioned, and as illustrated in FIG. 9, the support identification system 106 includes the graph topology generator 904. In particular, the graph topology generator 904 generate a graph topology having a plurality of nodes corresponding to a plurality of text phrases and a query. For example, the support identification system 106 can identify a plurality of text phrases and a query and then utilize the graph topology generator 904 to generate a graph topology based on the identified text phrases and query.

As shown in FIG. 9, the support identification system 106 further includes the support identification graph neural network training engine 906. In particular, the support identification graph neural network training engine 906 can train a support identification graph neural network to identify supporting text phrases that are relevant for responding to a query. For example, the support identification graph neural network training engine 906 can train the support identification graph neural network using the training text phrases 918 and the training queries 920.

Additionally, as shown in FIG. 9, the support identification system 106 includes the support identification graph neural network application manager 908. In particular, the support identification graph neural network application manager 908 can utilize the support identification graph neural network trained by the support identification graph neural network training engine 906. For example, the support identification graph neural network application manager 908 can utilize a support identification graph neural network to analyze a graph topology generated by the graph topology generator 904, generate node representations corresponding to the nodes, iteratively propagate and update the node representations, and then identify one or more supporting text phrases.

Further, as shown in FIG. 9, the support identification system 106 includes the digital response generator 910. In particular, the digital response generator 910 can generate digital responses to queries. For example, the digital response generator 910 can utilize supporting text phrases identified by the support identification graph neural network application manager 908 to generate a digital response to a query.

Additionally, as shown in FIG. 9, the support identification system 106 includes data storage 912 (e.g., as part of one or more memory devices). In particular, data storage 912 includes text phrases 914, a support identification graph neural network 916, training text phrases 918, and training queries 920. Text phrases 914 can include text phrases from which the support identification graph neural network application manager 908 can identify supporting text phrases. For example, text phrases 914 can store one or more passages of text that include a plurality of text phrases. The support identification graph neural network 916 can store the support identification graph neural network trained by the support identification graph neural network training engine 906 and used by the support identification graph neural network application manager 908 to identify supporting text phrases. Training text phrases 918 and training queries 920 store text phrases and queries, respectively, used by the support identification graph neural network training engine 906 to train a support identification graph neural network to identify supporting text phrases.

Each of the components 904-920 of the support identification system 106 can include software, hardware, or both. For example, the components 904-920 can include one or more instructions stored on a computer-readable storage medium and executable by processors of one or more computing devices, such as a client device or server device. When executed by the one or more processors, the computer-executable instructions of the support identification system 106 can cause the computing device(s) to perform the methods described herein. Alternatively, the components 904-920 can include hardware, such as a special-purpose processing device to perform a certain function or group of functions. Alternatively, the components 904-920 of the support identification system 106 can include a combination of computer-executable instructions and hardware.

Furthermore, the components 904-920 of the support identification system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 904-920 of the support identification system 106 may be implemented as a stand-alone application, such as a desktop or mobile application. Furthermore, the components 904-920 of the support identification system 106 may be implemented as one or more web-based applications hosted on a remote server. Alternatively, or additionally, the components 904-920 of the support identification system 106 may be implemented in a suite of mobile device applications or "apps." For example, in one or more embodiments, the support identification system 106 can comprise or operate in connection with digital software applications such as ADOBE® DOCUMENT CLOUD (e.g., asking a question regarding a currently opened document or regarding documents stored in a personal document repository on the cloud), ADOBE® EXPERIENCE MANAGER (e.g., asking a question about a product), ADOBE® SENSEI™ or ADOBE® PHOTOSHOP® (e.g., asking questions on how to use digital image editing tools). "ADOBE," "ADOBE DOCUMENT CLOUD," "ADOBE EXPERIENCE MANAGER," "SENSEI," and "PHOTOSHOP," are either registered trademarks or trademarks of Adobe Inc. in the United States and/or other countries.

Figure 10:
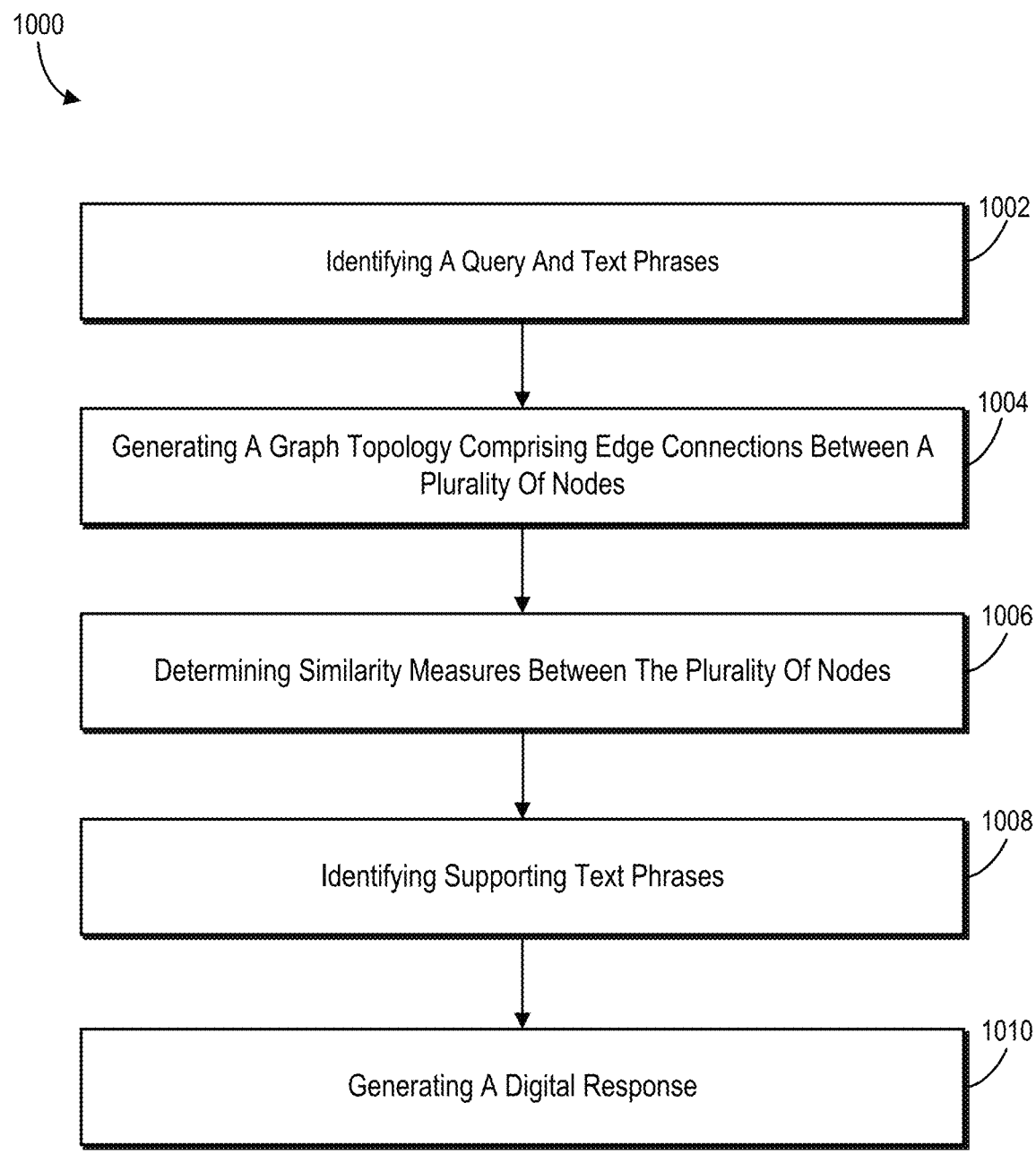
FIG. 10 illustrates a flowchart of a series of acts for generating a digital response to a query based on identified supporting text phrases in accordance with one or more embodiments.

FIGS. 1-9, the corresponding text, and the examples provide a number of different methods, systems, devices, and non-transitory computer-readable media of the support identification system 106. In addition to the foregoing, one or more embodiments can also be described in terms of flowcharts comprising acts for accomplishing the particular result, as shown in FIG. 10. FIG. 10 may be performed with more or fewer acts. Further, the acts may be performed in different orders. Additionally, the acts described herein may be repeated or performed in parallel with one another or in parallel with different instances of the same or similar acts.

As mentioned, FIG. 10 illustrates a flowchart of a series of acts 1000 for generating a digital response to a query based on identified supporting text phrases in accordance with one or more embodiments. While FIG. 10 illustrates acts according to one embodiment, alternative embodiments may omit, add to, reorder and/or modify any of the acts shown in FIG. 10. The acts of FIG. 10 can be performed as part of a method. For example, in some embodiments, the acts of FIG. 10 can be performed, in a digital medium environment for utilizing artificial intelligence to extract information from digital text that is relevant to queries, as part of a computer-implemented method for generating digital responses to the queries. Alternatively, a non-transitory computer-readable medium can store instructions that, when executed by at least one processor, cause a computing device to perform the acts of FIG. 10. In some embodiments, a system can perform the acts of FIG. 10. For example, in one or more embodiments, a system includes one or more memory devices comprising a plurality of text phrases and a support identification graph neural network trained to identify supporting text phrases relevant to queries. The system can further include one or more server devices that cause the system to perform the acts of FIG. 10.

The series of acts 1000 includes an act 1002 of identifying a query and text phrases. For example, the act 1002 involves identifying a query and a plurality of text phrases (e.g., from a repository text documents). To illustrate, the act 1002 can include receiving a query from a client device and accessing a repository of text documents to identify a plurality of text phrases.

The series of acts 1000 also includes an act 1004 of generating a graph topology comprising edge connections between a plurality of nodes. For example, the act 1004 involves generating a graph topology comprising edge connections between a plurality of nodes corresponding to the plurality of text phrases and the query.

To illustrate, in one or more embodiments, the support identification system 106 generates the graph topology comprising edge connections between the plurality of nodes by: generating a first set of edge connections between a first set of text-phrase nodes corresponding to text phrases from a first passage; generating a second set of edge connections between nodes from the first set of text-phrase nodes and a query node corresponding to the query; and generating at least one edge connection between at least one node from the first set of text-phrase nodes and a text-phrase node corresponding to a text-phrase from a second passage.

To provide another example, in one or more embodiments, the plurality of text phrases comprises a first text phrase from a first passage and a second text phrase from a second passage. Accordingly, the support identification system 106 can generate the graph topology by generating a first edge connection between a first text-phrase node corresponding to the first text phrase from the first passage to a second text-phrase node corresponding to the second text phrase from the second passage; and generating a second edge connection between the first text-phrase node corresponding to the first text phrase from the first passage and a query node. The plurality of text phrases can further include an additional text phrase from the first passage. Accordingly, the support identification system 106 can generate the graph topology by generating a third edge connection between an additional text-phrase node corresponding to the additional text phrase from the first passage to the first text-phrase node corresponding to the first text phrase from the first passage.

The series of acts 1000 further includes an act 1006 of determining similarity measures between the plurality of nodes. For example, the act 1006 involves utilizing a support identification graph neural network to determine similarity measures between the plurality of nodes based on the graph topology. Indeed, in one or more embodiments, the support identification system 106 utilizes a support identification graph neural network to determine, from the plurality of text phrases, supporting text phrases corresponding to the query. In one or more embodiments, the support identification graph neural network comprises one or more learned edge weights for propagating node representations along the edge connections of the graph topology. In some embodiments, the support identification graph neural network comprises one or more learned update weights for updating node representations. For example, the support identification graph neural network can include one or more learned update weights for updating states of the node representations.

In one or more embodiments, the support identification system 106 generates node representations for the plurality of nodes (e.g., before determining similarity measures), the node representations comprising embeddings for the plurality of text phrases and the query. For example, the support identification system 106 can generate a plurality of node representations corresponding to the plurality of text phrases and the query (e.g., via a support identification graph neural network) by generating text-phrase embeddings for the plurality of text phrases using a language embedding model;

generating a query embedding for the query using the language embedding model; and utilizing the text-phrase embeddings as node representations for text-phrase nodes from the plurality of nodes and the query embedding as a node representation for a query node from the plurality of nodes. In one or more embodiments, generating the node representations for the plurality of nodes comprises: utilizing a language embedding model to generate word embeddings corresponding to the plurality of text phrases and word embeddings corresponding to the query; generating text-phrase embeddings corresponding to the plurality of text phrases based on the word embeddings corresponding to the plurality of text phrases; and generating a query embedding corresponding to the query based on the word embeddings corresponding to the query, wherein a node representation corresponding to a given text phrase comprises a text-phrase embedding corresponding to the given text phrase and a node representation corresponding to the query comprises the query embedding.

In one or more embodiments, the support identification system 106 compares the node representations between pairs of nodes based on the graph topology to determine similarities (e.g., similarity measures) between the pairs of nodes.

To provide an illustration, in one or more embodiments, the support identification system 106 based on the graph topology, identifies a set of edge connections between a given node (e.g., a first node) and a set of connected nodes from the plurality of nodes. The support identification system 106 can then determine a node representation (e.g., a first node representation) for the given node (e.g., the first node) and connected node representations for the set of connected nodes. Based on the set of edge connections, the support identification system 106 can utilize one or more learned edge weights from the support identification graph neural network to generate a modified node representation corresponding to the given node (e.g., a modified first node representation) based on the connected node representations. In one or more embodiments, the support identification system 106 generates the modified first node representation by: determining a set of similarity measures between the first node representation and the connected node representations; generating attention weights based on the learned edge weights and the set of similarity measures; and generating the modified first node representation based on the attention weights.

In one or more embodiments, the support identification system 106 updates the node representations corresponding to the plurality of text phrases and the query based on the similarities between the pairs of nodes. In one or more embodiments, the support identification system 106 generates an updated node representation for the given node based on the node representation of the given node and the modified node representation utilizing a learned update weight from the support identification graph neural network (e.g., utilizes a learned update weight from the support identification graph neural network to generate an updated first node representation from the first node representation and the modified first node representation). In one or more embodiments, updating the node representations corresponding to the plurality of text phrases and the query comprises, for a given node, utilizing a neural network to update the node representation of the given node based on a node representation of the given node and node representations of connected nodes defined by the edge connections.

Additionally, the series of acts 1000 includes an act 1008 of identifying supporting text phrases. For example, the act 1008 involves utilizing the support identification graph neural network to further identify supporting text phrases from the plurality of text phrases based on the similarity measures between the plurality of nodes. Indeed, in one or more embodiments, the support identification system 106 identifies the supporting text phrases from the plurality of text phrases based on updated node representations.

To provide an illustration, in one or more embodiments, the support identification system 106 identifies the supporting text phrases by determining a similarity measure between the updated first node representation (discussed above) and the query by comparing the updated first node representation to a query node representation of a query node; and identifying a first text phrase corresponding to the first node as a supporting text phrase based on the similarity measure. Indeed, in one or more embodiments, the support identification system 106 can identify the supporting text phrases by, based on the set of edge connections, updating the connected node representations based on the first node representation; and comparing the updated connected node representations and a query node representation of a query node.

Further, the series of acts 1000 includes an act 1010 of generating a digital response. For example, the act 1010 involves generating a digital response to the query based on the supporting text phrases. In one or more embodiments, the support identification system 106 utilizes the support identification graph neural network to identify a supporting text phrase (i.e., a single text phrase) relative to the query from the plurality of text phrases. Accordingly, the support identification system 106 can generate the digital response to the query based on the supporting text phrase.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
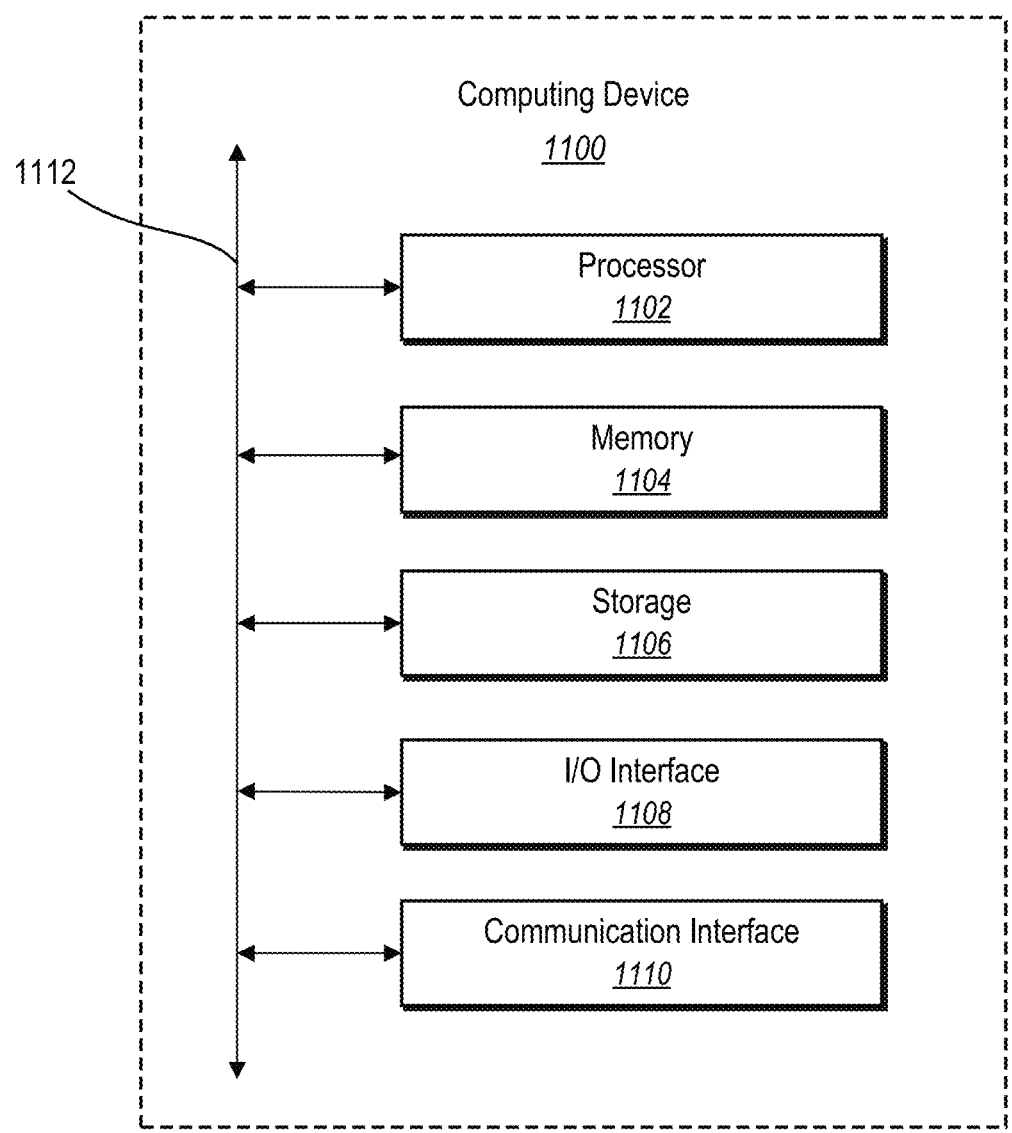
FIG. 11 illustrates a block diagram of an exemplary computing device in accordance with one or more embodiments.

FIG. 11 illustrates a block diagram of an example computing device 1100 that may be configured to perform one or more of the processes described above. One will appreciate that one or more computing devices, such as the computing device 1100 may represent the computing devices described above (e.g., the server(s) 102, the client devices 110a-110n, and/or the computing device 902). In one or more embodiments, the computing device 1100 may be a mobile device (e.g., a mobile telephone, a smartphone, a PDA, a tablet, a laptop, a camera, a tracker, a watch, a wearable device, etc.). In some embodiments, the computing device 1100 may be a non-mobile device (e.g., a desktop computer or another type of client device). Further, the computing device 1100 may be a server device that includes cloud-based processing and storage capabilities.

As shown in FIG. 11, the computing device 1100 can include one or more processor(s) 1102, memory 1104, a storage device 1106, input/output interfaces 1108 (or "I/O interfaces 1108"), and a communication interface 1110, which may be communicatively coupled by way of a communication infrastructure (e.g., bus 1112). While the computing device 1100 is shown in FIG. 11, the components illustrated in FIG. 11 are not intended to be limiting. Additional or alternative components may be used in other embodiments. Furthermore, in certain embodiments, the computing device 1100 includes fewer components than those shown in FIG. 11. Components of the computing device 1100 shown in FIG. 11 will now be described in additional detail.

In particular embodiments, the processor(s) 1102 includes hardware for executing instructions, such as those making up a computer program. As an example, and not by way of limitation, to execute instructions, the processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 including storage for storing data or instructions. As an example, and not by way of limitation, the storage device 1106 can include a non-transitory storage medium described above. The storage device 1106 may include a hard disk drive (HDD), flash memory, a Universal Serial Bus (USB) drive or a combination these or other storage devices.

As shown, the computing device 1100 includes one or more I/O interfaces 1108, which are provided to allow a user to provide input to (such as user strokes), receive output from, and otherwise transfer data to and from the computing device 1100. These I/O interfaces 1108 may include a mouse, keypad or a keyboard, a touch screen, camera, optical scanner, network interface, modem, other known I/O devices or a combination of such I/O interfaces 1108. The touch screen may be activated with a stylus or a finger.

The I/O interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1108 are configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 provides one or more interfaces for communication (such as, for example, packet-based communication) between the computing device and one or more other computing devices or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can include hardware, software, or both that connects components of computing device 1100 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium comprising instructions that, when executed by at least one processor, cause a computing device to:
    identify a query and a plurality of text phrases;
    generate a graph topology comprising edge connections between a plurality of nodes corresponding to the plurality of text phrases and the query; and
    generate, utilizing an analysis of the graph topology by a support identification graph neural network, a digital response to the query by:
        determining, utilizing the support identification graph neural network, similarity measures between the plurality of nodes based on the graph topology;
        identifying, utilizing the support identification graph neural network, supporting text phrases from the plurality of text phrases based on the similarity measures between the plurality of nodes; and
        generating the digital response to the query based on the supporting text phrases.

2. The non-transitory computer-readable medium of claim 1, further comprising instructions that, when executed by the at least one processor, cause the computing device to generate a plurality of node representations corresponding to the plurality of text phrases and the query by:
    generating text-phrase embeddings for the plurality of text phrases using a language embedding model;
    generating a query embedding for the query using the language embedding model; and
    utilizing the text-phrase embeddings as node representations for text-phrase nodes from the plurality of nodes and the query embedding as a node representation for a query node from the plurality of nodes.

3. The non-transitory computer-readable medium of claim 1, wherein the plurality of text phrases comprises a first text phrase from a first passage and a second text phrase from a second passage and further comprising instructions that, when executed by the at least one processor, cause the computing device to generate the graph topology by:
    generating a first edge connection between a first text-phrase node corresponding to the first text phrase from the first passage to a second text-phrase node corresponding to the second text phrase from the second passage; and
    generating a second edge connection between the first text-phrase node corresponding to the first text phrase from the first passage and a query node.

4. The non-transitory computer-readable medium of claim 3, wherein the plurality of text phrases further comprises an additional text phrase from the first passage, and further comprising instructions that, when executed by the at least one processor, cause the computing device to generate the graph topology by generating a third edge connection between an additional text-phrase node corresponding to the additional text phrase from the first passage to the first text-phrase node corresponding to the first text phrase from the first passage.

5. The non-transitory computer-readable medium of claim 1, wherein the support identification graph neural network comprises one or more learned edge weights for propagating node representations along the edge connections of the graph topology and one or more learned update weights for updating states of the node representations.

6. The non-transitory computer-readable medium of claim 1, further comprising instructions that, when executed by the at least one processor, cause the computing device to:
 based on the graph topology, identify a set of edge connections between a first node and a set of connected nodes from the plurality of nodes;
 determine a first node representation for the first node and connected node representations for the set of connected nodes; and
 based on the set of edge connections, utilize one or more learned edge weights from the support identification graph neural network to generate a modified first node representation based on the connected node representations.

7. The non-transitory computer-readable medium of claim 6, further comprising instructions that, when executed by the at least one processor, cause the computing device to utilize a learned update weight from the support identification graph neural network to generate an updated first node representation from the first node representation and the modified first node representation.

8. The non-transitory computer-readable medium of claim 7, further comprising instructions that, when executed by the at least one processor, cause the computing device to identify the supporting text phrases by:
 determining a similarity measure between the updated first node representation and the query by comparing the updated first node representation to a query node representation of a query node; and
 identifying a first text phrase corresponding to the first node as a supporting text phrase based on the similarity measure.

9. The non-transitory computer-readable medium of claim 6, further comprising instructions that, when executed by the at least one processor, cause the computing device to identify the supporting text phrases by:
 based on the set of edge connections, updating the connected node representations based on the first node representation; and
 comparing the updated connected node representations and a query node representation of a query node.

10. The non-transitory computer-readable medium of claim 6, wherein the instructions, when executed by the at least one processor, cause the computing device to generate the modified first node representation by:
 determining a set of similarity measures between the first node representation and the connected node representations;
 generating attention weights based on the one or more learned edge weights and the set of similarity measures; and
 generating the modified first node representation based on the attention weights.

11. A system comprising:
 one or more memory devices comprising a plurality of text phrases and a support identification graph neural network trained to identify supporting text phrases relevant to queries; and
 one or more server devices that cause the system to:
  generate a graph topology comprising edge connections between a plurality of nodes corresponding to the plurality of text phrases and a query; and
  utilize the support identification graph neural network to determine, from the plurality of text phrases, supporting text phrases corresponding to the query by:
   generating node representations for the plurality of nodes, the node representations comprising embeddings for the plurality of text phrases and the query;
   comparing the node representations between pairs of nodes based on the graph topology to determine similarities between the pairs of nodes;
   updating the node representations corresponding to the plurality of text phrases and the query based on the similarities between the pairs of nodes; and
   identifying the supporting text phrases from the plurality of text phrases based on the updated node representations.

12. The system of claim 11, wherein generating the node representations for the plurality of nodes comprises:
 utilizing a language embedding model to generate word embeddings corresponding to the plurality of text phrases and word embeddings corresponding to the query;
 generating text-phrase embeddings corresponding to the plurality of text phrases based on the word embeddings corresponding to the plurality of text phrases; and
 generating a query embedding corresponding to the query based on the word embeddings corresponding to the query,
 wherein a node representation corresponding to a given text phrase comprises a text-phrase embedding corresponding to the given text phrase and a node representation corresponding to the query comprises the query embedding.

13. The system of claim 11, wherein the one or more server devices cause the system to generate the graph topology comprising edge connections between the plurality of nodes by:
 generating a first set of edge connections between a first set of text-phrase nodes corresponding to text phrases from a first passage;
 generating a second set of edge connections between nodes from the first set of text-phrase nodes and a query node corresponding to the query; and
 generating at least one edge connection between at least one node from the first set of text-phrase nodes and a text-phrase node corresponding to a text-phrase from a second passage.

14. The system of claim 11, wherein updating the node representations corresponding to the plurality of text phrases and the query comprises, for a given node, utilizing a neural network to update a node representation of the given node based on the node representation of the given node and node representations of connected nodes defined by the edge connections.

15. The system of claim 11, wherein the one or more server devices cause the system to, for a given node from the plurality of nodes:
 based on the graph topology, identify a set of edge connections between the given node and a set of connected nodes from the plurality of nodes;
 determine a node representation for the given node and connected node representations for the set of connected nodes; and
 based on the set of edge connections, utilize one or more learned edge weights from the support identification graph neural network to generate a modified node representation corresponding to the given node based on the connected node representations.

16. The system of claim 15, wherein the one or more server devices cause the system to generate an updated node representation for the given node based on the node representation of the given node and the modified node representation utilizing a learned update weight from the support identification graph neural network.

17. The system of claim 11, wherein the one or more server devices cause the system to generate a digital response to the query based on the supporting text phrases.

18. In a digital medium environment for utilizing artificial intelligence to extract information from digital text that is relevant to queries, a computer-implemented method for generating digital responses to the queries, comprising:

identifying a query and a plurality of text phrases;

generating a graph topology comprising edge connections between a plurality of nodes corresponding to the plurality of text phrases and the query; and generating, utilizing an analysis of the graph topology by a support identification graph neural network, a digital response to the query by:

determining, utilizing the support identification graph neural network, similarity measures between the plurality of nodes based on the graph topology;

identifying, utilizing the support identification graph neural network, supporting text phrases from the plurality of text phrases based on the similarity measures between the plurality of nodes; and generating the digital response to the query based on the supporting text phrase.

19. The computer-implemented method of claim 18, wherein the support identification graph neural network comprises one or more learned edge weights for propagating node representations along edge connections of a graph topology.

20. The computer-implemented method of claim 19, wherein the support identification graph neural network comprises one or more update weights for updating the node representations.

* * * * *